(12) United States Patent
Dillon et al.

(10) Patent No.: US 7,389,330 B2
(45) Date of Patent: Jun. 17, 2008

(54) SYSTEM AND METHOD FOR PRE-FETCHING CONTENT IN A PROXY ARCHITECTURE

(75) Inventors: Douglas Dillon, Gaithersburg, MD (US); John Border, Poolesville, MD (US); Frank Kelly, Walkersville, MD (US); Daniel Friedman, Silver Spring, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 716 days.

(21) Appl. No.: 10/659,481

(22) Filed: Sep. 10, 2003

(65) Prior Publication Data

US 2004/0205149 A1    Oct. 14, 2004

Related U.S. Application Data

(60) Provisional application No. 60/409,737, filed on Sep. 11, 2002.

(51) Int. Cl.
*G06F 15/16* (2006.01)
*G06F 15/167* (2006.01)

(52) U.S. Cl. .............. 709/219; 709/203; 709/217; 709/227

(58) Field of Classification Search ............ 709/203, 709/217, 219, 227
See application file for complete search history.

(56) References Cited

U.S. PATENT DOCUMENTS 6,834,330 B2 * 12/2004 Yechiel ............... 711/137

| 2001/0043600 | A1 * | 11/2001 | Chatterjee et al. ......... 370/390 |
| 2002/0116473 | A1 * | 8/2002 | Gemmell ............... 709/219 |
| 2002/0120782 | A1 | 8/2002 | Dillon et al. |
| 2002/0176361 | A1 * | 11/2002 | Wu et al. ............... 370/231 |
| 2003/0037041 | A1 * | 2/2003 | Hertz .................... 707/1 |
| 2003/0106025 | A1 * | 6/2003 | Cho et al. ............... 715/523 |
| 2003/0112772 | A1 * | 6/2003 | Chatterjee et al. ......... 370/316 |
| 2003/0195940 | A1 * | 10/2003 | Basu et al. ............. 709/213 |
| 2004/0049579 | A1 * | 3/2004 | Ims et al. ............... 709/225 |
| 2004/0199664 | A1 * | 10/2004 | Feldman et al. .......... 709/238 |

(Continued)

FOREIGN PATENT DOCUMENTS

WO    WO 99/08429    2/1999

(Continued)

*Primary Examiner*—Ario Etienne
*Assistant Examiner*—Sargon N Nano
(74) *Attorney, Agent, or Firm*—Bell, Boyd & Lloyd LLP

(57) ABSTRACT

An approach is provided for supporting retrieval of a web page over a data network from a web site is disclosed. A downstream proxy communicating with a host executing a browser receives a request message from a browser to retrieve the web page. An upstream proxy parses the web page to determine an object embedded in the web page, wherein a promise list is generated specifying the embedded object that is to be pre-fetched according to a criterion. The promise list is transmitted to the downstream proxy, wherein the upstream proxy pre-fetches the embedded object from the web site. The upstream proxy determines whether to forward one of the pre-fetched embedded object to the downstream proxy based on a comparison of cookies associated with one of the pre-fetched objects supplied, respectively, by the browser and the web site. This approach as particular applicability in relatively high latency networks, such as a satellite communications system.

46 Claims, 10 Drawing Sheets

U.S. PATENT DOCUMENTS

2004/0258053 A1* 12/2004 Toporek et al. ............. 370/352
2005/0198309 A1* 9/2005 Li et al. ..................... 709/227

FOREIGN PATENT DOCUMENTS

WO     WO 01/61886 A2    8/2001
WO     WO 01/61886 A3    8/2001
WO     WO 01/63420 A1    8/2001

\* cited by examiner

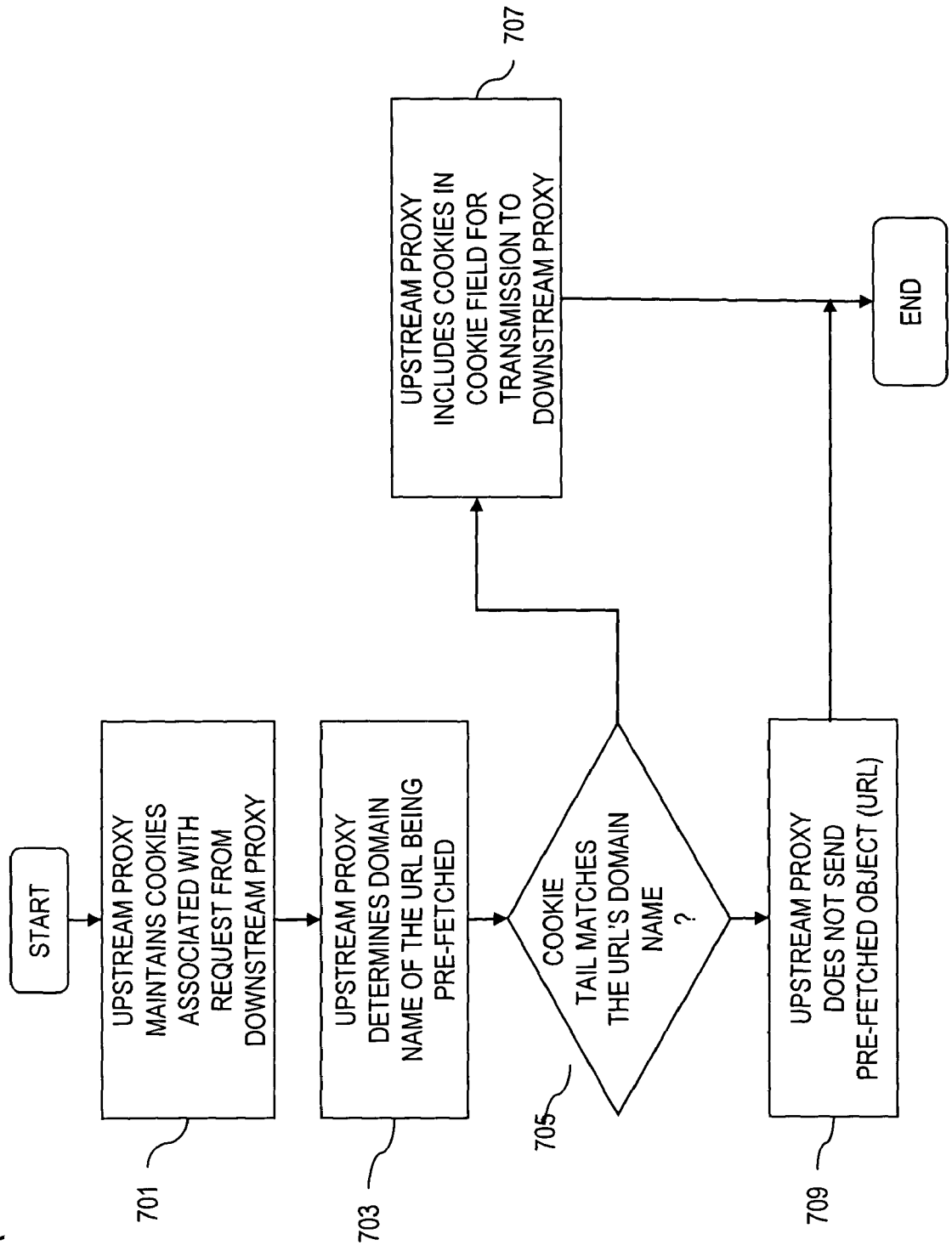

SYSTEM AND METHOD FOR PRE-FETCHING CONTENT IN A PROXY ARCHITECTURE

RELATED APPLICATIONS

This application is related to, and claims the benefit of the earlier filing date under 35 U.S.C. § 119(e) of, U.S. Provisional Patent Application (Ser. No. 60/409,737) filed Sep. 11, 2002, entitled "System and Method for Pre-fetching Content in a Proxy Architecture"; the entirety of which is incorporated herein by reference.

FIELD OF THE INVENTION

The present invention relates to a communication system, and is more particularly related to retrieving web content using proxy servers.

BACKGROUND OF THE INVENTION

The maturity of electronic commerce and acceptance of the Internet as a daily tool by a continually growing user base of millions of users intensify the need for communication engineers to develop techniques for enhancing network performance. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements from the network infrastructure. Therefore, network performance enhancing mechanisms are needed to optimize efficiency and reduce user response times. These mechanisms are imperative in systems with relatively high network latency, such as a satellite network.

FIG. 9 is a diagram of a conventional communication system for providing retrieval of web content by a personal computer (PC). PC 901 is loaded with a web browser 903 to access the web pages that are resident on web server 905; collectively the web pages and web server 905 denote a "web site." PC 903 connects to a wide area network (WAN) 907, which is linked to the Internet 909. The above arrangement is typical of a business environment, whereby the PC 901 is networked to the Internet 909. A residential user, in contrast, normally has a dial-up connection (not shown) to the Internet 909 for access to the Web. The phenomenal growth of the Web is attributable to the ease and standardized manner of "creating" a web page, which can possess textual, audio, and video content.

Web pages are formatted according to the Hypertext Markup Language (HTML) standard which provides for the display of high-quality text (including control over the location, size, color and font for the text), the display of graphics within the page and the "linking" from one page to another, possibly stored on a different web server. Each HTML document, graphic image, video clip or other individual piece of content is identified, that is, addressed, by an Internet address, referred to as a Uniform Resource Locator (URL). As used herein, a "URL" may refer to an address of an individual piece of web content (HTML document, image, sound-clip, video-clip, etc.) or the individual piece of content addressed by the URL. When a distinction is required, the term "URL address" refers to the URL itself while the terms "web content", "URL content" or "URL object" refers to the content addressed by the URL.

In a typical transaction, the user enters or specifies a URL to the web browser 903, which in turn requests a URL from the web server 905 using the HyperText Transfer Protocol (HTTP). The web server 905 returns an HTML page, which contains numerous embedded objects (i.e., web content), to the web browser 903. Upon receiving the HTML page, the web browser 903 parses the page to retrieve each embedded object. The retrieval process requires the establishment of separate communication sessions (e.g., TCP (Transmission Control Protocol) connections) to the web server 905. That is, after an embedded object is received, the TCP connection is torn down and another TCP connection is established for the next object. Given the richness of the content of web pages, it is not uncommon for a web page to possess over 30 embedded objects. This arrangement disadvantageously consumes network resources, but more significantly, introduces delay to the user.

Delay is further increased if the WAN 907 is a satellite network, as the network latency of the satellite network is conventionally a longer latency than terrestrial networks. In addition, because HTTP utilizes a separate TCP connection for each transaction, the large number of transactions amplifies the network latency. Further, the manner in which frames are created and images are embedded in HTML requires a separate HTTP transaction for every frame and URL compounds the delay.

Based on the foregoing, there is a clear need for improved approaches for retrieval of web content within a communication system. There is also a need to utilize standard protocols to avoid development costs and provide rapid industry acceptance. There is a further need for a web content retrieval mechanism that makes the networks with relatively large latency viable and/or competitive for Internet access. Therefore, an approach for retrieving web content that reduces user response times is highly desirable.

SUMMARY OF THE INVENTION

The present invention addresses the above stated needs by providing proxies to parse and pre-fetch web content over a data network. A downstream proxy receives a request from a browser to retrieve a web page from a web server. An upstream proxy parses the web page to determine objects embedded in the web page. The upstream proxy generates a promise list according to a criterion, including size and type of the embedded object. The promise list specifies the embedded objects that are to be pre-fetched from the web server. The promise list is transmitted to the downstream proxy, wherein the upstream proxy pre-fetches the embedded object from the web server. The upstream proxy determines whether to forward one of the pre-fetched embedded object to the downstream proxy based on a comparison of cookies associated with one of the pre-fetched objects supplied, respectively, by the browser and the web site. The upstream proxy also can obtain domain name service (DNS) information associated with the request, and the DNS information is piggybacked on one of the pre-fetched objects to the downstream proxy. Additionally, the downstream proxy selectively holds a subsequent request from the browser, if this request corresponds to an object specified on the list. Further, the downstream proxy and the upstream proxy utilize pre-fetched serial numbers to address duplicate transmissions of pre-fetched objects (and associated "promises") over the data network (e.g., satellite system). The above arrangement advantageously reduces response time, while conserving system bandwidth.

According to one aspect of an embodiment of the present invention, a method for providing a proxy service to retrieve content over a data network from a content server is disclosed. The method includes forwarding a request for the content over the data network towards the content server. A proxy in communication with the content server determines a plurality of objects corresponding to the content based on the request, the proxy generating a list specifying the objects that are to be pre-fetched according to a criterion. The method also includes receiving the generated list in response to the request. The method also includes receiving the pre-fetched objects on the list. Further, the method includes selectively holding a subsequent request associated with an object specified on the list.

According to another aspect of the invention, a network apparatus for providing a proxy service to retrieve content over a data network from a content server is disclosed. The apparatus includes an interface configured to forward a request for the content over the data network towards the content server. An upstream proxy in communication with the content server determines a plurality of objects corresponding to the content based on the request. The upstream proxy generates a list specifying the objects that are to be pre-fetched according to a criterion. The apparatus includes a downstream proxy configured to receive the generated list in response to the request and to receive the pre-fetched objects on the list, wherein the downstream proxy selectively holds a subsequent request associated with an object specified on the list.

According to another aspect of the invention, a method for providing a proxy service to retrieve content over a data network from a content server is disclosed. The method includes receiving a request for the content over the data network from a proxy. Also, the method includes generating a list specifying objects that are to be pre-fetched based on the request according to a criterion, and transmitting the generated list to the proxy in response to the request. The method also includes retrieving the objects in the list from the content server, and forwarding the objects on the list to the proxy, wherein the proxy selectively holds a subsequent request associated with an object specified on the list.

According to another aspect of the invention, a network apparatus for providing a proxy service to retrieve content over a data network from a content server is disclosed. The apparatus includes an interface configured to receive a request for the content over the data network from a downstream proxy. The apparatus also includes an upstream proxy configured to determine a plurality of objects corresponding to the content in response to the request, and to generate a list specifying the objects that are to be pre-fetched according to a criterion. The generated list is transmitted to the downstream proxy in response to the request. The upstream proxy retrieves the objects in the list from the content server. The objects on the list being are forwarded to the downstream proxy. The downstream proxy selectively holds a subsequent request associated with an object specified on the list.

In another aspect of the invention, a system for supporting retrieval of a web page over a data network from a web site is disclosed. The system includes a downstream proxy configured to receive a request message from a browser to retrieve the web page. The system also includes an upstream proxy configured to parse the web page to determine an object embedded in the web page, wherein a promise list is generated specifying the embedded object that is to be pre-fetched according to a criterion. The promise list is transmitted to the downstream proxy, wherein the upstream proxy pre-fetches the embedded object from the web site. The upstream proxy determines whether to forward one of the pre-fetched embedded object to the downstream proxy based on a comparison of cookies associated with one of the pre-fetched objects supplied, respectively, by the browser and the web site.

In yet another aspect of the invention, a system for supporting retrieval of a web page over a data network from a web site is disclosed. The system includes a first proxying means for receiving a request message from a browser to retrieve the web page. Also, the system includes an second proxying means for parsing the web page to determine an object embedded in the web page, wherein a promise list is generated specifying the embedded object that is to be pre-fetched according to a criterion. The promise list is transmitted to the first proxying means, wherein the second proxying means pre-fetches the embedded object from the web site. The second proxying means determines whether to forward one of the pre-fetched embedded object to the first proxying means based on a comparison of cookies associated with one of the pre-fetched objects supplied, respectively, by the browser and the web server.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 7A and 7B are flowcharts of a process for handling cookies in a parse and pre-fetch operation, according to an embodiment of the present invention;

DESCRIPTION OF THE PREFERRED EMBODIMENT

A system, method, and software for supporting a parse and pre-fetch proxy service to retrieve web content are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is described with respect to a satellite network and HyperText Transfer Protocol (HTTP), it is recognized by one of ordinary skill in the art that the present invention has applicability to other wide area networks (WANs) and data protocols.

Figure 1:
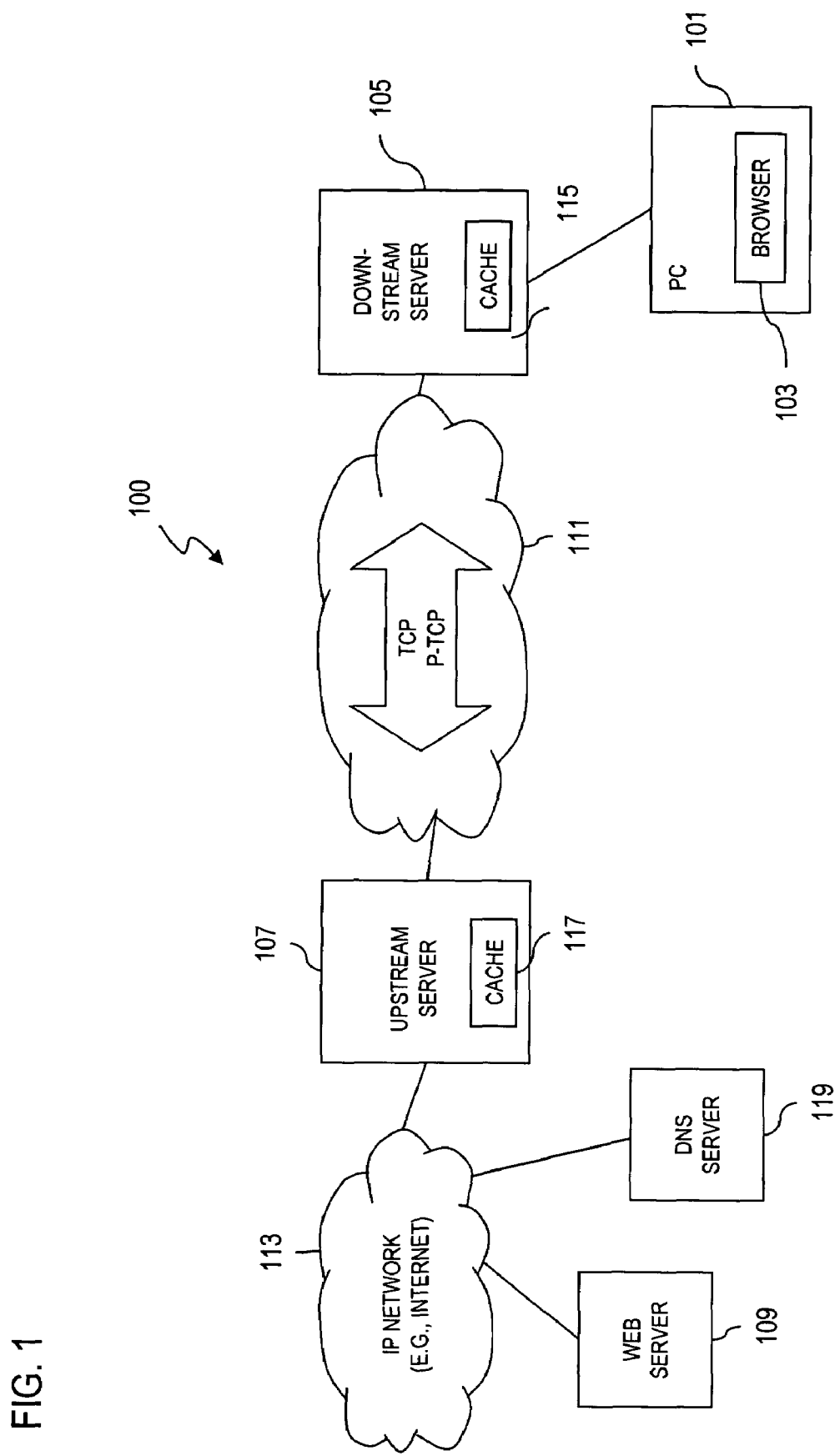
FIG. 1 is a diagram of a communications system capable of supporting a parse and pre-fetch process via upstream and downstream proxies, according to an embodiment of the present invention.

FIG. 1 shows a diagram of a communications system capable of supporting a parse and pre-fetch process via upstream and downstream proxies, according to an embodiment of the present invention. A communication system 100 includes a user station 101 that utilizes a standard web browser 103 (e.g., Microsoft® Internet Explorer, Netscape® Navigator). In this example, the user station 101 is a personal computer (PC); however, any computing platform may be utilized, such as a workstation, web enabled set-top boxes, wireless Personal Digital Assistant (PDA), "webified" (i.e., web enabled) cell phone, web appliances, and etc. The phenomenal growth of the Web is attributable to the ease and standardized manner of "creating" a web page, which can possess textual, audio, and video content. Web pages are formatted according to the Hypertext Markup Language (HTML) standard which provides for the display of high-quality text (including control over the location, size, color and font for the text), the display of graphics within the page and the "linking" from one page to another, possibly stored on a different web server. Each HTML document, graphic image, video clip or other individual piece of content is identified, that is, addressed, by an Internet address, referred to as a Uniform Resource Locator (URL). As used herein, a "URL" may refer to an address of an individual piece of web content (HTML document, image, sound-clip, video-clip, etc. ) or the individual piece of content addressed by the URL. When a distinction is required, the term "URL address" refers to the URL itself while the terms "web content", "URL content" or "URL object" refers to the content addressed by the URL.

The communication system 100, in an exemplary embodiment, utilizes two proxy servers 105, 107, which are referred to as a downstream proxy server 105 and an upstream proxy server 107, respectively. As used herein, the terms "upstream" and "downstream" refer to the flow of content from a content server (e.g., a web server) to the client. According to one embodiment of the present invention, the terms comply with the definitions specified in the Internet Engineering Task Force (IETF) Request for Comment (RFC) 2616 (HTTP 1.1), the proxy closer to the web server 109 is termed the upstream proxy server, while the proxy closer to the web browser 103 is termed the downstream proxy.

Figure 2:
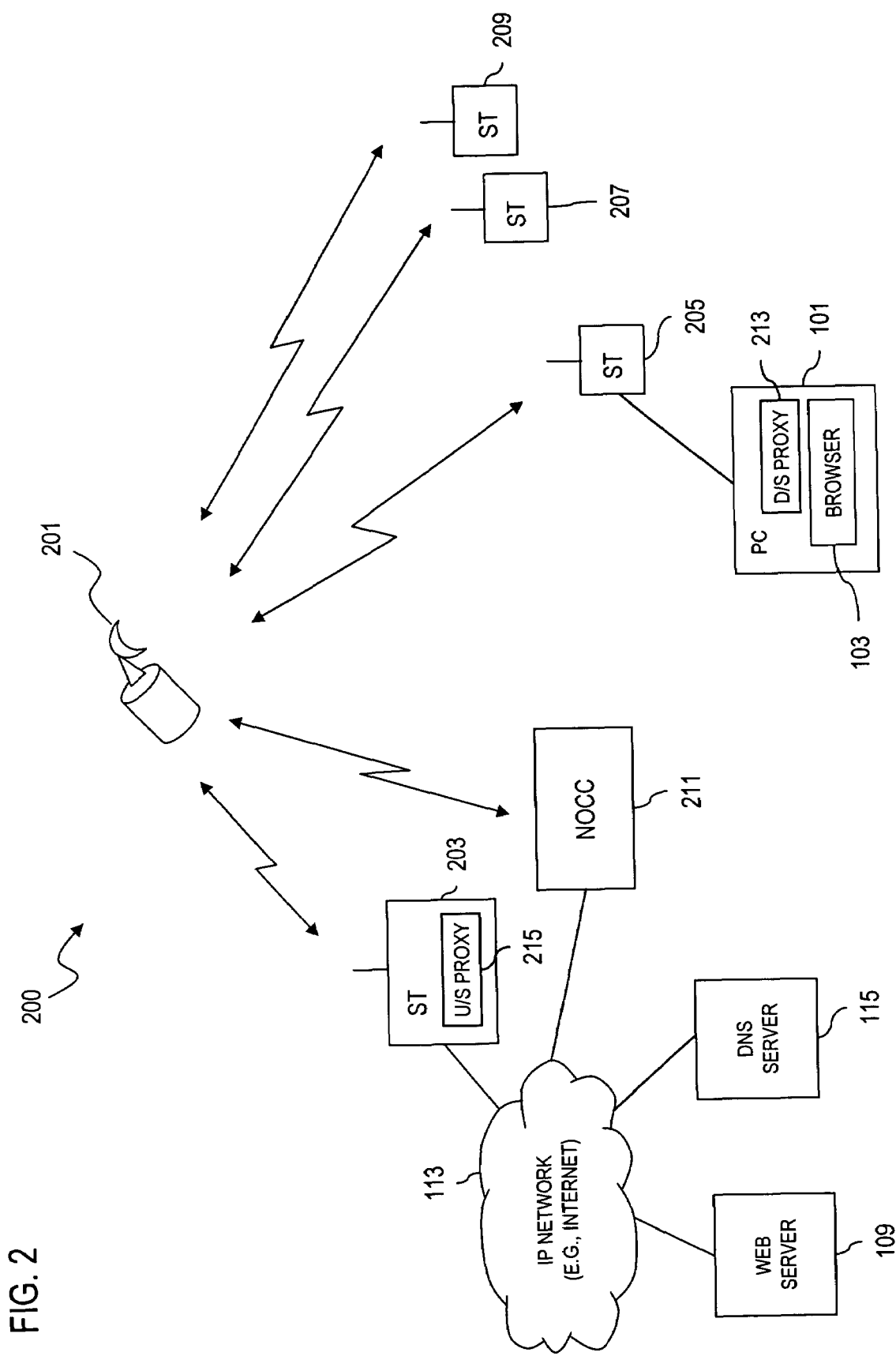
FIG. 2 is a diagram of a satellite communication system capable of supporting a parse and pre-fetch process, in accordance with an embodiment of the present invention.

PC 101 connects to the downstream proxy server 105, which communicates with the upstream proxy server 107 through a wide area network (WAN) 111. According to an embodiment of the present invention, the WAN 111 is a VSAT (Very Small Aperture Terminal) satellite network (as shown in FIG. 2). Alternatively, the network 111 may be any type of Wide Area Network (WAN); e.g., ATM (Asynchronous Transfer Mode) network, router-based network, T1 network, etc. The upstream server 107 has connectivity to an IP network 113, such as the Internet, to access a web server 109.

The proxy servers 105 and 107, according to an embodiment of the present invention, are HyperText Transfer Protocol (HTTP) proxy servers, and accordingly, communicate using Transmission Control Protocol (TCP) connections, in which multiple TCP connections may be used to support parallel HTTP transactions. In addition, the servers 105 and 107 can communicate using persistent connections (e.g., as provided by HTTP 1.1). Use of persistent connections enables a single TCP connection to be reused for multiple requests of the embedded objects within a web page associated with the web server 109. Additionally, the TCP Transaction Multiplexing Protocol (TTMP) may be utilized to further enhance network efficiencies. HTTP is an application level protocol that is employed for information transfer over the Web. The Internet Engineering Task Force (IETF) RFC (Request for Comment) 2616 specifies this protocol and is incorporated herein in its entirety. As will be described in more detail later, these proxy services (or functions) may also be resident entirely within the host 101 or within a router or satellite terminal, or a combination thereof.

The web browser 103 can access URLs either directly from the web server 109 or through HTTP proxy servers 105 and 107. A web page (HTML page) may refer to various source documents by indicating the associated URLs. As discussed above, a URL specifies an address of an "object" in the Internet 113 by explicitly indicating the method of accessing the resource. A representative format of a URL is as follows: http://www.hns.com/homepage/document.html. This example indicates that the file "document.html" is accessed using HTTP.

Upon receiving the HTML page, the web browser 103 parses the page to retrieve each embedded object. The retrieval process requires the establishment of separate communication sessions (e.g., TCP (Transmission Control Protocol) connections) to the web server 109. That is, after an embedded object is received, the TCP connection is torn down and another TCP session is established for the next object. Given the richness of the content of web pages, it is not uncommon for a web page to possess a large number (e.g., over 30) embedded objects; thereby consuming a substantial amount of network resources, but more significantly, introduces delay to the user. The establishment of the TCP connection takes one round trip traversal of the WAN 111 and then the requesting of the URL and receiving its response takes another round trip traversal.

Delay is of a particular concern in the system 100 if the WAN 111, in an exemplary embodiment, is a satellite network (FIG. 2), in that the network latency of the satellite network is conventionally longer than terrestrial networks. To minimize such delay, the system 100 provides a transparent parse and pre-fetch proxy service. That is, this service reduces response time by parsing HTML documents responses and by fetching and forwarding over the network 111 a subset of the referenced URLs in such a way that they are delivered to the browser 103 as soon as possible by the downstream proxy server 105. This process is referred to as pre-fetching a URL. Under this scenario, the upstream proxy server 107, which is on the web server side of the WAN 111, parses the HTML page of the web server 109, identifies the objects embedded in the HTML page, and pre-fetches such objects from the web server 109. The upstream proxy server 107 forwards the pre-fetched objects across the WAN 111 towards the web browser 103 to the counterpart downstream proxy server 105 from which the web browser 103 can retrieve the objects without transmitting a message (e.g., GET message) across the WAN 111. These pre-fetched objects are stored in the respective caches 115 and 117. The downstream proxy server 105 can deliver a pre-fetched URL to the browser 103 immediately if the URL was delivered to the downstream proxy server 105, for example, less than a configurable expiration timeout (e.g., default of 30 sec.) prior to the downstream proxy server 105 receiving the browser's request. This process of pre-fetching is described more fully below with respect to FIG. 4.

HTTP proxy servers 105 and 107 act as intermediaries between one or more browsers and many web servers (e.g., web server 109). A web browser 103 requests a URL from the proxy server (e.g., 105) which in turn "GETs" the URL from the addressed web server 109. Alternatively, web browser 103 may send its requests directly to web server 109 with HTTP proxy server 105 "transparently" intercepting and acting upon such requests. An HTTP proxy 105 itself may be configured to either access URLs directly from a web server 109 or from another HTTP proxy server 107.

Further, the upstream proxy server 107 can forward Domain Name Service (DNS) information obtained from a DNS server 119 to the downstream proxy server 105. The robustness of the global Internet 113 stems in part from the naming system that is in place for one machine to communicate with another machine. The naming system that has been adopted is known as the Domain Name System or Domain Name Service (DNS), which permits machines to be identified by "domain names" (i.e., host names), which provide a more readily usable address naming scheme for human recognition; for example, "hns.com". Applications, such as e-mail or web-browsing, utilize domain names in their communication with remote machines and other processes. This communication requires the translation or mapping of domain names to numeric addresses, such as Internet Protocol (IP) addresses, to reach specific machines. In essence, DNS provides a mapping of domain names to IP addresses. The DNS is a distributed database that stores the domain name, IP address, as well as other information about hosts. The distributed database is implemented by storing various portions of the database across multiple servers in a hierarchical structure—these servers are termed "DNS servers." Thus, the host associated with the application submits queries to a DNS server for a specific IP address of a particular destination machine. In this example, the browser 103 has to perform a DNS lookup to convert a URL's web server domain name into an IP address. That is, the user enters or specifies a URL to the web browser 103 of the host 101, which in turn requests a URL from the web server 109. The host 101 may need to resolve an Internet Protocol (IP) address corresponding to a domain name of the URL from the DNS server 115. Such a domain name lookup conventionally requires a traversal of the WAN 111 which introduces additional delay. The web server 109 returns an HTML page, which contains numerous embedded objects (i.e., web content), to the web browser 103.

FIG. 2 shows a diagram of a satellite communication system capable of supporting a parse and pre-fetch process, in accordance with an embodiment of the present invention. In particular, the system of FIG. 2 illustrates a specific implementation of the system of FIG. 1, in which the WAN 111 is a satellite system 200, which includes a satellite 201 that supports communication among satellite terminals (STs) 203, 205, 207, and 209. The system 200 employs a Network Operations Control Center (NOCC) 211 to manage and control communication services and operations. For example, the NOCC 211 provisions and identifies the channels that are to be allocated.

In an exemplary embodiment, the STs 203, 205, 207, and 209 are Very Small Aperture (VSAT) terminals. Under this architecture, users can communicate from one satellite terminal (ST) to another ST directly with one satellite hop.

The use of proxies (e.g., downstream (D/S)) proxy 213 in conjunction with an upstream proxy 215 (which can reside within the ST 203) improves the response time of web applications over the satellite system 200 by parsing HTML documents and redirecting HTTP responses and by fetching and forwarding over the satellite link a subset of the referenced URLs. The parse and pre-fetch operation employs a selection criteria that is based on the size of the URL and its content-type. The selection criteria, in an exemplary embodiment, can specify the forwarding of embedded images, embedded HTML (frames), cascading style sheets and javascript URLs of moderate size, in which the maximum pre-fetched size being individually configurable for each kind of URL.

Although the downstream proxy 213 is shown within the PC 101, it is contemplated that the downstream proxy 213 can also reside within the ST 205.

Figure 3:
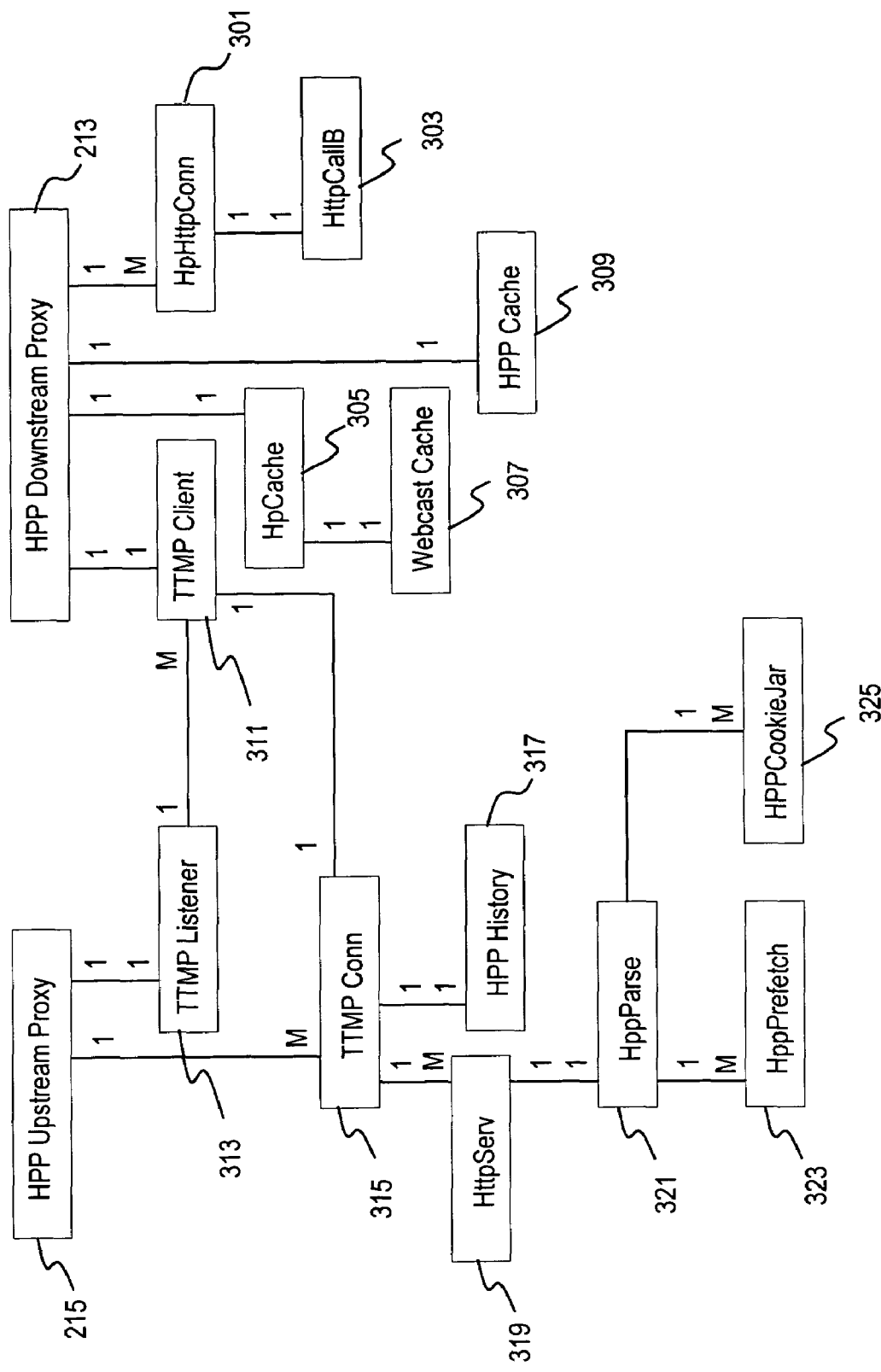
FIG. 3 is a diagram of the functional components the upstream proxy and the downstream proxy of the system of FIG. 1.

FIG. 3 shows a diagram of the functional components of the upstream proxy and the downstream proxy of the system of FIG. 1. Although only a single downstream proxy 213 is shown, it is contemplated that the upstream proxy 215 can serve multiple downstream proxies. The downstream proxy 213, for example, can communicate through a client/server arrangement with the upstream proxy 215 via a single TCP connection carrying the TCP Transaction Multiplexing Protocol (TTMP).

For the purposes of explanation, the components of the upstream proxy 215 and the downstream proxy 213 are described as object codes (or objects). According to one embodiment of the present invention, the downstream proxy 213 includes a HpHttpConn object 301 for handling of connections, and a HttpCallB object 303 to support handling of HTTP response data for a HTTP request. The downstream proxy 213 listens on pre-designated ports (e.g., ports 83 and 85), and creates an HpHttpConn object 301 to handle a connection. The HpHttpConn object 301 performs a cache lookup through a HpCache object 305. The HpCache object 305, in an exemplary embodiment, provides webcast lookups in a webcast cache 307. If the webcast cache lookup fails, the HpHttpConn object 301 creates an HttpCallB object 303.

The HpHttpConn object 301 looks up the URL in a HppCache object 309 registering the callback with the HppCache object 309. If the cache lookup fails in such a way that indicates the URL has not yet been promised, the HttpCallB object 303 also initiates a TTMP transaction via a TTMP client object passing itself to a TTMP client 311.

The HttpCallB object 303 associated with the URL, which started a train of pre-fetches, handles the TTMP response. This TTMP response includes both the URL and the piggybacked pre-fetches. The HttpCallB object 303 returns its URL to the browser and puts the pre-fetched URLs in the HppCache 309. The HppCache 309 passes a pre-fetched URL to each of the HttpCallB objects 303, which are waiting on that URL. This can be executed under a receive thread of the TTMP client 311, just like any other HttpCallB call. These HttpCallB objects 303, if possible, pass the URL to their browser.

A Callback Table holds an entry for each HttpCallB object 303, which is currently awaiting a URL. A Callback Table entry can include the following fields: refCallB—a pointer to the callback object itself; URL Hash—a hash of the URL being waited upon; pNext—a pointer to the next callback object waiting for the same URL; SerialNumber—a serial number which is incremented with every insertion of an item into the table. The Callback Table includes an array of entries that initially are put into a free list using the pNext pointer. When a HttpCallB object 303 is inserted into the table, a handle is returned to the caller. This handle includes the index into the Callback Table and the serial number. The handle is used by a caller to subsequently reference this Callback Table. When a Callback Table entry is deleted, its URL Table entry is looked up using the Url Hash field and the entry is removed from that table's CallBackPointer list. This may result in freeing the Url Table entry if the URL was "never promised". The Callback Table entry is then initialized and put on the free list.

If a retry of the URL is required, then these HttpCallB objects 303 initiate a TTMP transaction (with HttpCallB) necessary to retry the URL. The TTMP client object permits a call back object to initiate the TTMP transaction without deadlocking.

With respect to the upstream proxy 215, a TTMP Listener object 313 listens for TCP connections on a pre-determined port (e.g., port 86) and allocates a TTMPConn object 315 to each accepted connection. The initial capabilities negotiation on the TTMP connection allows the upstream proxy 215 to determine whether the downstream proxy 213 is capable of HPP operation. The TTMPConn object 315 includes a HppHistory object 317 to support the downstream proxy 213 by keeping a history of promises and determining when a request for a promised URL has been received. That is, the HppHistory object 317 determines whether an HppPromised response should be returned to the downstream proxy 213. The history need not be that deep, as the HppHistory object exists only to handle cases where the browser 103 requests a URL shortly before the promise for the URL arrives at the downstream proxy 213.

The HppPromised response contains a pre-fetch serial number that identifies the most recent pre-fetch operation that has promised this URL. The HppPromised response is returned in the following events: when the request is not a bypass request and the URL has been recently promised to the downstream proxy, and when the request is a bypass request and the URL has been promised more recently that in the pre-fetch operation identified by the HppBypass field's snsnsn parameter.

The HppBypass field, when present, indicates that the downstream proxy 215 wants the URL retrieved even when it had been promised by a specific pre-fetch operation. This field has the format: HppBypass: a, snsnsn, as defined by Table 1.

TABLE 1

| PARAMETER | DEFINITION |
| --- | --- |
| a | A single ASCII character, indicates the reason why the downstream proxy had to request this URL with a Bypass operation and can takes one of the following values:<br>H(NoHeader) - the URL's pre-fetched response header contained an HppHeaderOnly field<br>C(NoCookie) - the URL was pre-fetched without Cookies and the request had one or more cookies<br>W(WrongCookie) - the URL was pre-fetched with Cookies, but the Cookies used did not match those supplied by the browser<br>P(Purged) - the URL was pre-fetched but purged from the cache to make room for other pre-fetched URLs prior to its being requested by the browser<br>E(Expired) - the URL was pre-fetched and available in the cache but had been expired<br>I(Internal Error) - the URL was pre-fetched and could not be sent down due to internal error in the downstream proxy |
| snsnsn | 6 decimal digits, contains the pre-fetch serial number which identifies the pre-fetch operation that has to be bypassed. This is used by the upstream proxy to determine whether another promise of the URL has been made. If so, the upstream proxy returns an HppPromised response even though a bypass request was made. |

The TTMPConn object 315 creates an HttpServ object 319 for each URL request received on a TTMP connection. The HttpServ object 319 executes the HPP History lookup and returns an HppPromised response when the lookup succeeds and the request does not contain a valid HPPBypass field. Otherwise, the HttpServ object 319 retrieves the requested object from the web server 109. If the object is HTML or a redirection (and the downstream proxy 213 is HPP capable), the HttpServ object 319 creates an HppParse object 321 to parse the HTML or redirection and complete the processing of the URL.

According to an embodiment of the present invention, the HppHistory object 317 is a server object receiving lookup requests from its TTMPConn object 315 and receiving insertion requests from the HppParse objects 321 contained by a TTMPConn object's HttpServ objects. The HppHistory object 317 is created when its parent TTMPConn object 315 is created.

Further, the HppHistory object 317 can be implemented as a special kind of hash table, whereby collisions are handled via a linked list for each hash bucket to allow easy insertion and deletion. When a duplicate is inserted, it is inserted at the end of a FIFO (First In First Out), and earlier items are removed. Entries are initially placed on a free list and maintained on a FIFO doubly linked list thereafter. When the free list has emptied and a new entry is required, the oldest entry on the FIFO list is recycled.

An HppHistory entry, by way of example, includes the following fields (beyond those necessary for the hash table and recycle and free lists): URL Hash; and a Pre-fetch Serial Number—for identifying the order in which the pre-fetch operation promised the URL to handle duplicate requests for a pre-fetched URL. Further, a Pre-fetchHistoryDepth parameter can be used to determine the size of the HppHistory object 317 by specifying the maximum number of entries which can be put in the table.

The HppParse object 321 can determine which URLs are to be parsed and then to manage HppPre-fetch objects 323 and their transmission of parse and pre-fetch data back to the downstream proxy 213. The HppParse object 321 parses the HTML or redirection and returns it to the downstream proxy 215 without closing the TTMP transaction. The HppParse object 321 then appends a set of promises to the TTMP transaction response and creates the set of HppPre-fetch objects 323 to pre-fetch the promised URLs. The HppPre-fetch object 323 adds each promised URL to the HppHistory object 317. These HppPre-fetch objects 323 make the HTTP request and either return the entire object (when it passes the size limitation) as a single chunk appended to the TTMP transaction or returns just the HTTP response header (when it fails the size limitation) appended to the TTMP transaction. The HppParse object 321 closes the TTMP transaction when all of the promised URLs have been processed by HppPre-fetch objects 323.

The HppParse object 321, according to one embodiment of the present invention, serves a single HttpServ object 319 at a time. The HppParse object 321 is allocated to the HttpServ object 319 after an HttpResponse header for a URL that requires parsing has been processed and sent to the downstream proxy 213. Additionally, the HppParse object 321 has an interface accessed by the HttpServ object 319 and HppPre-fetch object 323 that allows it to be loaded with the HTML data to be parsed (or the Location HTTP Response header field when parsing a redirection).

Further, the HppParse object 321 has an interface accessed by the HttpServ object 319 which allows parse pre-fetching to be initiated or aborted. The HppParse object 321 can also access and control HppPre-fetch objects 323, including obtaining a pre-fetch object, starting a pre-fetch, aborting a pre-fetch and returning a pre-fetch object. The HppParse object 321 has an interface that permits HppPre-fetch objects 323 to send complete, formatted pre-fetch objects downstream via the HttpServ and TTMPConn objects 319, 315, respectively.

The HppPre-fetch object 323 is similar to the HttpServ object 319 in that it has buffers for the HttpRequest header, the HttpResponse header as well as a buffer for the entity body. The HppPre-fetch objects 323, when not controlled by the HppParse object 321, exist on a free list which is populated by a configurable number of objects.

The HppParse object 321 can include an HTML buffer, a current promise list buffer, a current candidate list of Hpp-Pre-fetch objects, and a list of pending pre-fetch objects. The HTML buffer contains the HTML to be parsed; the size of the buffer can be set to hold a typical HTML page. The current promise buffer holds an ASCII promise list. The candidate list of HppPre-fetch objects 323 contains one object for each entry in the current promise buffer's list; these objects are waiting to be turned on when the parsing completes. The pending pre-fetch table contains the HppPre-fetch objects 323 that are currently running. As their processing completes, the HppPre-fetch objects 323 are removed from the table and returned to a HppPre-fetch free list.

The size of the HPP Parse object's HTML buffer, current promise list buffer and pending pre-fetch table are configurable. If the size of the HTML buffer is exceeded, then only the HTML that fits is parsed. If the size of the current promise list is saturated, then only the promises that fit are promised. Pending pre-fetch table entries and HppPre-fetch objects are allocated as parsing takes place. If the size of the pending pre-fetch table is exhausted or no more HppPre-fetch objects can be obtained, then no more pre-fetch promises can be made. The PendingPre-fetch list can be a doubly linked list of HppPre-fetch objects 323, such that an object may quickly be deleted from the list.

The HppParse objects 321, when not controlled by the HttpServ object 319, exist on a free list that is populated by a configurable number of objects at startup of the proxy service. New parse and pre-fetch operations are disabled when the free list is empty. Additionally, the HppParse object 321 can utilize the following configuration parameters listed in Table 2, below.

TABLE 2

| PARAMETER | DEFINITION |
| --- | --- |
| MaxSimultaneousPre-fetchOperations | Maximum number of simultaneous pre-fetch operations which the upstream proxy may perform at any one time. The upstream proxy allocates this number of HppParse objects at startup |
| MaxParseSizeInBytes | Size of the HppParse object's HTML buffer |
| MaxPre-fetchesPerPage | Limits the number of objects which can be promised as the result of one pre-fetch operation. This limits the size of an HppParse object's PendingPre-fetch table |
| PromiseBufferSizeInBytes | Limits the size of any HppPromiseList |

According to one embodiment of the present invention, a HppCookieJar object 325 is created at the same time as the HppParse object 321. The HppCookieJar object 325 stores the cookies associated with a pre-fetch operation and to produce the appropriate set of cookies for each pre-fetched URL's HTTP request. The handling of cookies by the parse and pre-fetch operation is more fully described in FIG. 7.

The HppCookieJar object 325 supports the following interfaces: Control, HttpRequestParsing, HttpResponseParsing, and AppendCookieLine. The Control interface supports creation, deletion, and initialization of the object. The HttpRequestParsing interface provides parsing of a HttpRequest received from the downstream proxy 213. This interface takes the cookies out of the request and puts them in the "jar." The HttpResponseParsing interface is used to parse an HttpResponse either resulting from a request from the downstream proxy or from a pre-fetch operation, and takes the cookies supplied by SET-COOKIE fields and puts them in the jar. The AppendCookieLine interface is used to add the appropriate Pre-fetch Request cookie field to a pre-fetch type request. This interface also returns the CookieHash for the resulting cookie that is to be passed to the downstream proxy 213 along with the pre-fetched data. The AppendCookieLine interface is accessed for a URL at the time the HppPre-fetch object 323 is allocated to the URL.

The HppCookieJar object 325, in an exemplary embodiment, is an insert-only data structure, whereby cookies are inserted one-by-one into the data structure. The HppCookieJar object 325 defines various member variables enumerated in Table 3.

TABLE 3

| VARIABLE | DEFINITION |
| --- | --- |
| m_numCookies | The number of cookies currently in the array |
| m_arraySize | The number of elements in the array. This value is specified by the HppMaxCookies configuration parameter |
| m_cookieStructArray | An array of structures. Each array entry handles one cookie. The member variables of an array entry are as follows:<br>m_pCookieName - a pointer to the cookie name.<br>m_NameHash - hash of the cookie name.<br>m_pCookieDomain - pointer to the cookie's domain. |
| m_cookieBufSize | The size of the cookie buffer in bytes. This value is specified by the CookieBufSizeInBytes configuration parameter |

TABLE 3-continued

| VARIABLE | DEFINITION |
|---|---|
| m_cookieBufUsed | The number of bytes used in the cookie buffer |
| m_pCookieBuf | The cookie buffer where cookie names and domains are stored as null terminated strings. The values are sequentially designated. If there is insufficient space in either the array or the buffer, the cookie is not accepted into the jar. |

Further, the HppCookieJar object 325 employs the following configuration parameters: CookieJarCapacity, and CookieJarBufSizeInBytes. The CookieJarCapacity parameter identifies the maximum number of cookies that the cookie jar can contain; that is, the maximum number of cookies that can be utilized in a single pre-fetch operation. This parameter defines the size of the cookie jar's array. The CookieJarBufSizeInBytes parameter identifies the total size of all the cookies that may be utilized within a single pre-fetch operation.

The above objects of the downstream proxy 213 and the upstream proxy 215 support the parse and pre-fetch capability.

Figure 4:
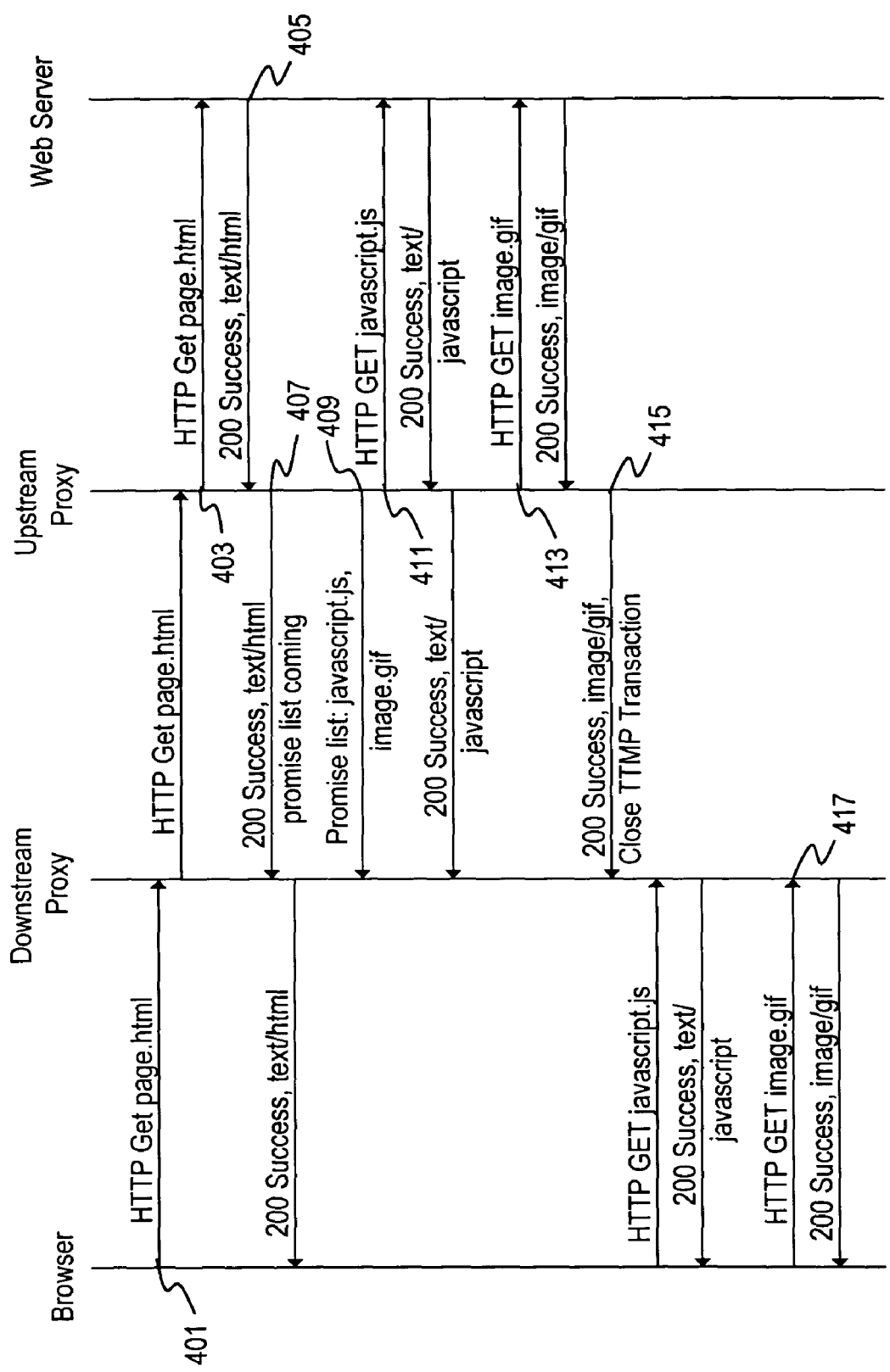
FIG. 4 is a ladder diagram of a parse and pre-fetch process, according to an embodiment of the present invention.

FIG. 4 is a ladder diagram of a parsing and pre-fetching process, according to an embodiment of the present invention. For the purposes of explanation, the parse and pre-fetch operation is described with respect to a web page that includes HTML as well as one javascript URL and one embedded image (both objects are under the size limit). It is also assumed that the browser 103 requests the style sheet and image only after they have been completely pre-fetched.

In step 401, the browser 103 opens a TCP connection and sends a request for the web page, page.html, towards the web server 109. The downstream proxy 213 creates an HpHttpConn object 301, which performs a cache lookup of page.html. The cache lookup fails (in both the Hpp cache 309 and the webcast cache 307), and thus, the HpHttpConn object 301 creates an HttpCallB object 303 and forwards the request via a TTMP transaction to the upstream proxy server 215.

The TTMPConn object 315 of the upstream proxy 215, as in step 403, receives the request and creates an HttpServ object 319 to handle the request. The HttpServ object 319 looks the URL up in its HppHistory 317. The lookup, in this case, fails and the HttpServ object 319 opens a TCP connection and sends a request for the web page to the web server 109. The web server 109, as in step 405, returns a success HTTP response header whose content-type field indicates text/html followed by the HTML itself.

Next, in step 407, the HttpServ object 319 of the upstream proxy 215 creates an HppParse object 321, which forwards the HTTP response header with an additional field, an HPPAwait field (which indicates parse and pre-fetch information will be appended to the HTTP response's entity body). The HPPAwait field has the following format: snsnsn, where snsnsn is a 6 digit decimal number containing the pre-fetch serial number associated with what will be pre-fetched from this URL. When a nested parse is occurring this value will be the serial number associated with the originally parsed URL.

In step 409, the upstream proxy 215, via its HppParse object 321, parses the HTML and creates a "promise list" of candidate URLs to be pre-fetched. This list is appended to the TTMP transaction after the HTML is completely transmitted in the form of a promise list. As a result, the upstream proxy 215 is promising to provide additional information and/or the HTTP response for each pre-fetch candidate URL in the promise list.

Thereafter, in step 411, the HppParse object 321 of the upstream proxy 215 creates an HppPre-fetch object 323 for each of the candidates on the list. The HppPre-fetch object 323, which has its own thread, performs an HTTP GET transaction for each of the candidates in the list. This process can occur with multiple such transactions being retrieved in parallel, although the two candidates for this page, javascriptjs and image.gif, are shown as being retrieved sequentially.

As the HppPre-fetch object 323 of the upstream proxy 215 parses its candidate URL's HTTP response, per step 413, the HppPre-fetch object 323 checks its size according to the configurable content-type threshold. If the HppPre-fetch object 323 does not exceed the threshold, the HppPre-fetch object 323 returns the URL's HTTP response header and the HTTP response entity body. However, if the threshold is exceeded, the upstream proxy 215 returns only the URL and the HTTP response header. It is noted that the URLs need not be sent in the order called out in the promise list, but the upstream proxy 215 is expected to send a response for each of the promised URLs. Next, the HppParse object 321 of upstream proxy 215 closes the TTMP transaction when data for each of the promised URLs has been returned.

The downstream proxy 213, upon receiving a pre-fetched URL's HTTP response header and optional HTTP response entity body, per step 415, places these items as a unit in the HppCache 309. As will be discussed later, special processing takes place upon receipt of a pre-fetched URL, etc. when the downstream proxy 213 has already received an HTTP request for the URL.

Thereafter, in step 417, the downstream proxy 213 satisfies an HTTP request with the HTTP response header and entity body from the HppCache 309 when the browser 103 requests an pre-fetched URL residing in the HPP cache 309.

As previously mentioned, the parse and pre-fetching operation supports a rich set of capabilities. For example, the proxies can pre-fetch based on a configurable size limit, such that URLs that exceed this limit are not pre-fetched. According to an exemplary embodiment, the parse and pre-fetch service can specify a number of configurable parameters with respect to the treatment of various HTML content. For example, cascading style sheet (CSS) URLs that are referenced by HTML documents can be pre-fetched provided these URLs are less than a configurable MaxCSSPre-fetch-Size parameter. Javascript URLs that are referenced by HTML documents can also be pre-fetched according to a MaxJSPre-fetchSize parameter. Other such parameters can be designated: MaxFramePre-fetchSize parameter—HTML frame URLs; MaxPopupPre-fetchSize parameter—popup HTML window URLs referenced by HTML documents; and MaxImagePre-fetchSize parameter—embedded images referenced by HTML documents.

The HPP service can also support forwarding of the last-modified date with parsed URLs when the URL is too large to be forwarded. The downstream proxy satisfies such a request with a "Not Modified" HTTP response when possible. Also, the HPP operation avoids multiple transmission of pre-fetched URLs even when the request for the URL arrives prior to the commitment to pre-fetch it.

Furthermore, the parse and pre-fetch process advantageously reduces inbound traffic usage by compressing requests, blocking multiple requests in a single TCP segment when appropriate, and by not sending requests for URLs that will be pre-fetched. The proxies 213, 215 can also support piggybacking DNS information with the pre-fetched objects; that is, the IP address associated with a URL's host can be forwarded and, if the proxies are so configured, can pass the translation to the DNS cache. In addition, the parse and pre-fetch process service can multiplex all traffic across the satellite on a single client-server TCP connection, thereby allowing the process to operate even when Network Address Translation/Port Address Translation (NAT/PAT) exists between the downstream and upstream proxies 213, 215. The upstream proxy can additionally retain statistical information, allowing the amount of response time benefit and amount of additional outroute utilization to be quantified. The HPP service can further operate with sites that support the use of cookies.

To ensure that the HTTP Parse and pre-fetch service pre-fetches and delivers the correct Web objects to the browser 103, the downstream proxy 213 and the upstream proxy 215 provide for proper handling of cookies that are both sent from the browser 103 and returned from the Web server 109. This process is more fully described with respect to FIGS. 7A and 7B. The HPP upstream proxy 215, when pre-fetching URLs, provides the same cookies associated with the parsed URL (e.g., HTML or redirection request) HTTP request, assuming the server tail matches the parsed URL's domain name and the HTTP response for the parsed URL did not include a SET COOKIE or SET COOKIE2 field. The HPP upstream proxy 215, when pre-fetching URLs, utilizes the same cookies provided by the parsed URL's HTTP response SET COOKIE or SET COOKIE2 field, assuming the server tail matches the parse URL's domain name. Given these two conditions, the HPP upstream proxy 215 uses the superset of the cookies provided by the browser 103 in the original request and those provided by the server 109 with the parsed object when pre-fetching URLs of that parsed object. The HPP upstream proxy 215 forwards the HTTP cookies used to pre-fetch an object along with that object to the HPP downstream proxy 213.

According to one embodiment of the present invention, two maximum size thresholds are designated for each content type: one threshold for pre-fetching a URL when no HTTP Cookies are included in the pre-fetch request, and another threshold (typically a smaller value) for when cookies are included in the request. Because it is highly probable that requests with HTTP Cookies result in wasted bandwidth, setting a smaller threshold in the "with cookies" option minimizes waste of bandwidth. The HPP upstream proxy 215 uses these thresholds to handle the pre-fetched objects.

The HPP downstream proxy 213 is configurable to reject pre-fetched URLs and to retry those URLs with the browser's cookies when the cookies used to pre-fetch the URL are different from the cookies used with the request from the browser 103. The configurable settings include the following: Retry on cookie mismatch, Retry on cookie missing, Retry on restrictive cookie mismatch, and No cookie retries. In the "Retry on cookie mismatch" setting, the downstream proxy 213 retries the URL when the browser's request had cookies and either those cookies were not the same as the cookies used to pre-fetch the URL or the pre-fetch used no cookies. The downstream proxy 213, however, does not retry if the pre-fetch operation used cookies while the browser 103 does not. The "Retry on cookie missing" setting, which is the default setting, provides for retrying the URLs when the browser's request had cookies, and the cookies used on the pre-fetch were not a match or superset of the cookies in the browser's request. With the "Retry on restrictive cookie mismatch" setting, the downstream proxy 213 only retries when the pre-fetch operation employed cookies and the browser 103 did not. Lastly, with the "No cookie retries" setting, the downstream proxy 213 does not retry the cookies under any condition.

With respect to the exemplary scenario of FIG. 2, the upstream proxy 215 sends the COOKIE: field used to pre-fetch a URL back to the downstream proxy 213 in an HppCookie HTTP response header. The downstream proxy 213 then perform the necessary comparisons of the browser request cookies with the pre-fetch request cookies.

Further, the parse and pre-fetch service, according to one embodiment of the present invention, supports collection of statistical data. For example, the upstream proxy 215 maintains one or more log files, which capture statistics on a periodic basis (e.g., once per minute); these statistics can include the number of bytes, the number of URLs pre-fetched from each category of pre-fetchable items, the number of "304 wasted" bytes, and the number of URLs which were pre-fetched with "304 wasted"—in such a case, the URL was pre-fetched and yet could have been handled with a HTTP 304 (Not Modified) response. Other statistical data include the number of "cookie wasted" bytes, and associated URLs that were pre-fetched, whereby "cookie wasted" signifies that the URL was pre-fetched and yet had to be rejected because the cookies used to pre-fetch the URL did not match the cookies in the browser's request. Similarly, the log file can supply the number of "spinster wasted" bytes and the associated URLs, wherein "spinster wasted" indicates that the URL was pre-fetched, but was never requested by a browser 103. Table 4 enumerates additional statistics:

TABLE 4

| DATA | DEFINITION/STATE |
|---|---|
| ParseStatus | ParseStatus - one of:<br>Not parsed.<br>Parsed - Parsed but not pre-fetched.<br>Pre-fetchedParsed - Both pre-fetched and parsed.<br>That is, this URL was pre-fetched because it was "embedded" in another page but was also parsed because it was HTML or a redirection. |
| Pre-fetchStatus | Pre-fetchStatus - one of:<br>Not pre-fetched - the URL was not pre-fetched.<br>Pre-fetched - the URL was pre-fetched and this log entry was created when the URL was pre-fetched.<br>Pre-fetched Header Only - the URL was pre-fetched but only its header could be forwarded.<br>BypassHeaderOnly - the URL was promised (and probably pre-fetched), but it had to be re-requested because only the header was supplied and the whole URL needed to be retrieved.<br>BypassNoCookie - the URL was pre-fetched, but it had to be re-requested because it was pre-fetched without cookies while the browser's request had cookies.<br>BypassWrongCookie - the URL was pre-fetched, but it had to be re-requested because it was pre-fetched with cookies different from the cookies supplied with the browser request. For each of these "bypass" type log file entries the analyst should normally expect to see earlier in the log a Pre-fetched or Pre-fetched Header |

TABLE 4-continued

| DATA | DEFINITION/STATE |
|---|---|
| | Only log file entry. |
| | Pre-fetchReasons - one of: |
| | Not pre-fetched |
| | Redirected HTML |
| | Redirected Image |
| | Redirected Other |
| | Frame HTML |
| | Javascript |
| | Cascaded Style Sheet (CSS) |
| | Embedded Image |
| Pre-fetch URL Hash | A decimal number that is one of the following: |
| | A 32-bit hash of the URL when the URL is one that initiates a string of pre-fetches. This hash must never be zero. |
| | A 32-bit hash of the URL which initiated a string of pre-fetches when the log file entry is a pre-fetched entry. This hash must never be zero. |
| | 0 if neither of the above. |
| URL Hash | A decimal number which is a 32-bit hash of this entry's URL where the hash must never be zero |
| Page Start Ticks | The start ticks associated with when the first URL for the "page" was received by the upstream proxy. This field can be used to help determine the web page response time. |
| PromiseBufferSizeInBytes | Limits the size of any HppPromiseList |

In addition to the information in Table 4, the log file can indicate whether the URL initiated a string of pre-fetches, was pre-fetched, had just its header pre-fetched or none of these situations occurred.

From the perspective of the downstream proxy 213, the proxy 213 can also maintain a log file of statistical data. For instance, the downstream proxy 213 provides an entry in the log file for each pre-fetched URL supplied by the upstream proxy 215. The entry for this URL is logged after either the URL is requested by the browser 103 and processed, or the URL is removed from the HppCache 309 without being requested. The log file can retain data including response time statistics and outcome of that pre-fetch operation with respect to a pre-fetched URL, such as that listed in Table 5 below.

TABLE 5

| DATA | DEFINITION |
|---|---|
| Server Response Time | Time as measured by the upstream proxy. This represents the time the browser is waiting for the pre-fetch to complete, except when the URL has to go through an HppBypass operation |
| Overall Response Time | Time as measured by the downstream proxy. This represents the time the browser is waiting for the pre-fetch to complete except when the URL has to go through an HppBypass operation |
| HPP Response Time | max(0, Overall Response Time - Server Response Time). This will be zero except when the URL has to go through an HppBypass operation |
| Spinster | Never requested by browser. |
| Cookie Retry | Had to be retried with a cookie |
| Beat Promise | The browser request came before the promise. |
| Beat Pre-fetch | The browser request came after the promise, but before the pre-fetched data. |
| After Pre-fetch | The browser request came after the promise and after the pre-fetched data |

The downstream proxy 213 can also specify in the log file an entry for a pre-fetched URL to indicate whether only the header was pre-fetched by the upstream proxy and whether a 304 NOT-MODIFIED RESPONSE could be created from that header and, if fully pre-fetched whether or not a 304 NOT-MODIFIED RESPONSE could have been created from just the header.

Furthermore, global statistics can be maintained in a trace log, per Table 6.

TABLE 6

| DATA | DEFINITION |
|---|---|
| MaxSimultaneousPre-fetchOperations | Counts the maximum number of simultaneous HppParse objects in use. |
| MaxSimultaneousPre-fetchTransactions | Counts the maximum number of simultaneous HppPre-fetch objects in use |
| MaxCSSSize | Records the maximum sized CSS file seen |
| MaxJavascriptSize | Records the maximum sized Javascript file seen |
| MaxFrameHTMLSize | Records the maximum sized frame HTML page seen |
| MaxRedirectionHTMLSize | Records the maximum sized HTML page seen as a result of a redirection. |
| MaxPopupHTMLSize | Records the maximum sized popup HTML page seen |
| MaxEmbeddedImageSize | Records the maximum sized embedded image seen |
| MaxRedirectionImageSize | Records the maximum sized image seen that was referenced by a redirection. |
| ParseSizeExceeded | Counts the number of times the HppParse object HTML buffer was not big enough for the whole page to be parsed. |
| Pre-fetchSizeExceeded | Counts the number of times the MaxPrefectchSizeInBytes parameter was exceeded. |
| MaxCookiesExceeded | Counts the number of times the maximum number of cookies was exceeded. |
| CookieBufExceeded | Counts the number of times the cookie buffer could not hold all the cookies. |
| MaxHistoryDepth | Records the depth of the furthest back URL in the history that resulted in an HppPromised response. |
| MaxPre-fetchesPerPage | Records the maximum number of pre-fetches ever performed for a page |
| MaxPre-fetchesCount | Counts the number of times the MaxPre-fetchesPerPage count is exceeded |
| PromiseBufferExceededCount | Counts the number of times the PromiseBufferSizeInBytes is not big enough to hold all of the promises |

The operation of the parse and pre-fetch service as described above and in FIG. 4 represents a normal operational case. However, a number of special cases can arise; some of these cases are now described. For example, when one of the candidate URLs to be pre-fetched fetched is an HTML document, the upstream proxy 215 parses this candidate URL provided the HTML document is small enough to be pre-fetched. When the HTML is too large to be pre-fetched, the upstream proxy 215 sends an "HppHeaderOnly" response to the downstream proxy 213 and does not attempt to parse the HTML. The HppHeaderOnly field, in an exemplary embodiment, includes has the format: n, r, where n is a whole number containing what would have been contained in the header's content length field (e.g., n contains 0 when the original header had no CONTENT-LENGTH field); and r is a one character reason code indicating why the URL could not be pre-fetched. For example, r can specify the following: L indicating that the response is "too long"—e.g., longer than the configurable threshold for this URL's content-type; C indicating that the response is too long and the request had cookies (the response had a content-length field and the request contained Cookies and the URL's size exceeded the configurable threshold for that content-type with cookies); and I indicating that the HTTP response is invalid.

If the HTML is small enough to be pre-fetched, the following steps occur. First, the upstream proxy 215 attaches an HPPAwait tag to the pre-fetched HTML URL's HTTP response header as the upstream proxy 215 forwards the response header and HTML entity/body (if small enough) to the downstream proxy 213. It is noted that this tag helps in addressing race conditions, as discussed below. The HPPAwait field is added by the HPP upstream proxy 215 as an optional HTTP header in addition to the HPP Promise list (which comes after the parsed object) to cover race conditions. Next, the upstream proxy 215 parses the HTML and appends a promise list with a list of candidate URLs to be pre-fetched from this HTML document. The upstream proxy 215 appends the candidate list of URLs obtained from this HTML document to those obtained from earlier HTML documents for a particular TTMP transaction. Also, the upstream proxy 215 determines, via standard DNS mechanisms, the IP addresses of hosts referenced in URLs, and forwards the DNS information to the downstream proxy 213. Thereafter, the upstream proxy 215 performs an HTTP GET and forwards the results for the candidate URLs, just as the proxy does candidate URLs from the original Web page. The downstream proxy 213 can accept the responses for these URLs in any order, even intermingled with candidate URLs from the original Web page.

Another special case involves HTTP redirection, which occurs when the HTTP response to an HTTP GET is either "301", "Moved Permanently or 302", or "Moved Temporarily." The upstream proxy 215 treats a redirection as it would an HTML file which references a single "pre-fetchable" URL The upstream proxy 215 attaches an HPPAwait field to the pre-fetched redirection HTTP response header as it forwards the response header and HTML entity/body (if present and small enough) to the downstream proxy 213. As mentioned, the HPPAwait tag addresses race conditions. The upstream proxy 215 parses the redirection in the HTTP response header and forwards a promise list with a single candidate URL, the redirected URL. Also, the upstream proxy 215 appends this additional candidate URL to those obtained from earlier HTML documents (if any) for this TTMP transaction. Further, the upstream proxy 215 performs an HTTP GET and forwards the results for a redirection URL.

Another situation involves a pre-fetched URL failing to meet the maximum size threshold for the URL's content-type. This can be determined by the upstream proxy 215, under normal conditions, from the URL's HTTP Response CONTENT-LENGTH field. When the URL is too large, the upstream proxy 215 forwards the HTTP response header with an "HppHeaderOnly" header field. As a result, the upstream proxy 215 will not be forwarding the HTTP response body to the downstream proxy 213. When the browser 103 requests that URL, the downstream proxy 213 either has to re-request the URL in a separate HTTP Parse and pre-fetch transaction or satisfy the request with a "304 Not Modified" response. The downstream proxy 213 can satisfy the request with a 304 response when the request has a GET IF MODIFIED SINCE field and the pre-fetched HTTP response header has a LAST-MODIFIED field and the last modified date is at or before the IF-MODIFIED-SINCE date. The downstream proxy 213 adds an HPPBYPASS field to the HTTP request header when re-requesting the URL to ensure that the upstream proxy 215 will request the URL without performing any parsing and pre-fetching of the result.

In another special case, the HTTP CONTENT-LENGTH field may be missing from an HTML page, as this field is an optional field. The CONTENT-LENGTH field indicates the length of an HTTP response's entity body. Although the use of this field for HTTP is optional, the field is needed for pre-fetched URLs and HTML URLs preceding pre-fetched URLs. When the content length field is missing from an HTML page that would ordinarily start a pre-fetch operation, the upstream proxy 215 sends the HTML page downstream using, for example, the HTTP 1.1 chunked transfer encoding, but where the Transfer-Encoding field's transfer coding takes the value "hppchunked". In an exemplary embodiment, the chunk size is selected to match what is convenient for TTMP and each chunk fits within a TTMP block. The downstream proxy 213 removes the chunked transfer encoding and sends the HTML to the browser 103 and closes the connection to the browser 103 when the transfer is complete. Furthermore, when the CONTENT-LENGTH field is missing from a URL that is being pre-fetched, the upstream proxy 215 reads in the URL's entity body up to a configurable size, and, depending on the size of the entity body, either forwards the HTTP response header with a CONTENT-LENGTH field when the entire Entity Body fits within the configurable size; or forwards the HTTP response header with an HppHeaderOnly header when the Entity Body does not fit within the configurable size. Thus, when the browser 103 requests that URL, the downstream proxy 213 will either re-request the URL in a separate HTTP Parse and pre-fetch transaction or satisfy the request with a 304 Not Modified response just as it would for a URL which was too long to be pre-fetched.

In the event of a TTMP connection failure, the upstream proxy 215 aborts any outstanding HTTP requests either ordinary or pre-fetch requests, and clears the connection's HppHistory 317. Also, the downstream proxy 213 aborts any outstanding HTTP requests, and clears the HppCache 309.

As noted previously, a number or race conditions between Requests and Promises need to be considered: (1) Request Before Promise, After HppAwait; (2) Request Before Promise; and (3) Request After Promise, Before Pre-fetched Data. The "Request Before Promise, After HppAwait" special case takes place when the browser 103 requests a URL and the downstream proxy 213 is in a state between receiving a URL with an HppAwait header field and the promise list for that URL. This frequently occurs on fast PCs when the HppAwait is for an HTML file and the browser 103 quickly initiates the retrieval of dependent URLs even before the entire HTML has been received. The processing associated with this special case is intended to reduce unnecessary HTTP requests being sent across the satellite link, which reduces loading both on the satellite link and on the upstream proxy 215. Specifically, the special processing takes place when an HttpCallB object 303 performs an HppCache lookup, and the URL has not been promised. The HttpCallB object 303 blocks its HpHttpConn object thread when this occurs (and the cache 309 is between the reception of an HppAwait field and the associated promise list). The HttpCallB object 303 unblocks and reruns its cache lookup (the downstream proxy 213 is effectively x the HTTP request) if one of the following conditions occur. One condition involves the promise list having been received and all of the promises having been put in the cache 309. When this occurs and the URL is one of those promised the unnecessary HTTP request is not sent. The downstream proxy 213 can also hold the HTTP request until a configurable timeout (e.g., 150 ms) occurs, at which time the processing occurs is similar to that of the Request-Before-Promise special case (described below). The HTTP request is also held if the TTMP connection goes down, such that the processing occurs as if the TTMP connection is down momentarily before the Hpp Cache 309 lookup occurring.

The Request-Before-Promise special case involves a situation when the browser 103 requests a URL that is going to be promised by the upstream proxy 215 before the promise reaches the downstream proxy 213. Under this scenario, the downstream proxy 213 sends an ordinary request for the URL to the upstream proxy 215. The upstream proxy 215 receives the URL request, looks up the URL in the proxy's HppHistory 317, finds that URL in an un-expired state, and sends an HTTP response header with an HppPromised response. In other words, the upstream proxy 215 keeps track of the URLs that are being processing for parse and pre-fetch, realizing that it has already issued a promise for the URL requested. The upstream proxy 215, on a separate TTMP transaction, sends the promise to the downstream proxy 213. In addition, the upstream proxy 215 sends the promised URL data. These steps of the upstream proxy 215 are in a race condition.

When the step of looking up the HppHistory occurs before the upstream proxy 215 sends the promised URL data, the downstream proxy 213 waits for the arrival of the promised URL. When the upstream proxy 215 sends the promise to the downstream proxy 213 before the other steps, the downstream proxy 213 waits for the arrival of the promised URL data. The TTMP transaction is not aborted.

After the upstream proxy 215 sends the promised URL data, the downstream proxy 213 first checks whether the HTTP response header from the step of looking up the HppHistory 317 has arrived; if the response has not arrived, the downstream proxy 213 prepares to silently ignore the HTTP response header (resulting from the look-up) when it comes. This is accomplished by aborting the TTMP transaction in such a way that no packet is sent upstream. The downstream proxy 213 then handles the promised URL data as if it were the normal case. It may, if the data provided is an HppHeaderOnly, have to re-request the URL in a separate HTTP request (and TTMP transaction) bearing the HPPBypass header.

The Request After Promise special case occurs when the browser 103 requests a URL for which the downstream proxy 213 has already received a promise. In this situation, the downstream proxy 213 waits for the arrival of the promised URL. When the data for the promised URL arrives, the downstream proxy 213 handles the data as in the normal case. However, the downstream proxy 213 may, if the data provided is an HppHeaderOnly, have to re-request the URL using the optional HPPBypass header in a separate HTTP request (TTMP transaction).

The HTTP parse and pre-fetch operation can encounter other conditions, such as failures and errors. For example, a "Failed Pre-Fetch" occurs when a valid HTTP response for a candidate URL could not be obtained. This situation can stem from a failure in the DNS lookup, whereby the domain name of the server could not be determined. A connection failure can also result in a failed pre-fetch operation, in which a connection to the server could not be obtained. In these scenarios, the upstream proxy 215 creates an appropriate HTTP error response header (e.g., perhaps with an entity body) for the downstream proxy 213, which then forwards the response to the browser 103 that interprets the header.

A Failed Pre-fetch condition can also result if the HTTP protocol version is not compatible; for example, the web server failed to respond within a reasonable timeout or responded with a message other than a valid HTTP response header (e.g., older, incompatible HTTP version—HTTP 0.9). The pre-fetch operation can also fail if the wrong number of entity body bytes are received; that is, the web server did not send the number of bytes specified in the CONTENT-LENGTH field, or the server did not send a valid HTTP response. A Failed Pre-fetch condition can also result if the HTTP protocol version is not compatible; for example, the web server failed to respond within a reasonable timeout or responded with a message other than a valid HTTP response header (e.g., older, incompatible HTTP version—HTTP 0.9). In these cases, the upstream proxy 215 creates an appropriate HTTP response header with an HppHeaderOnly field. The downstream proxy 213 then handles this case as if the response was too long and performs a separate HTTP Parse and pre-fetch transaction with the HPPBypass header.

The HTTP parse and pre-fetch operation can also fail if the downstream proxy 213 cannot forward a pre-fetched object. One example is a situation in which the cookies in the actual browser's request were different from the cookies used to pre-fetch the object. When this occurs, the downstream proxy 213 handles the request as if it received a response header with an HppHeaderOnly field and performs a separate TTMP transaction with the HPPBypass header.

Moreover, the HTTP parse and pre-fetch operation can encounter difficulty if the downstream proxy 213 has to process HTTP non-GET requests. In particular, if the downstream proxy 213 receives an HTTP HEAD, POST, PUT or other HTTP request which is not a GET request, the downstream and upstream proxies forward the request to the Web server 109 bypassing parse and pre-fetch. The proxies return the response in the request's HTTP parse and pre-fetch transaction to the downstream proxy 213, which forwards the response to the browser 103.

Pre-fetching may not be possible, if the upstream proxy 215 is out of resources. A separate HppPre-fetch object 323 (with thread) is required for each URL to be pre-fetched. The HppParse object 321 obtains the HppPre-fetch object 323 prior to putting a URL in a promise list. If such an object cannot be obtained, the HppParse object 321 leaves the URL out of the promise list. As a result, the upstream proxy 215 requires that an HppPre-fetch object 323 be available for every promised URL. Thus, a separate HppParse object 321 having an adequate buffer is required to begin the pre-fetch operation. The HttpServ object 319 obtains the HppParse object 321 prior to returning an HppAwait in the HTTP response field. If an HppParse object 321 cannot be obtained, the upstream proxy 215 does not initiate a pre-fetch operation.

According to one embodiment of the present invention, the HppCache 309 is intended to be used for caching pre-fetched URLs and delivering such a URL within a short expiration timeout to the browser 103 (e.g., expiration timeout is 30 sec). Under certain circumstances, duplicate HTTP requests may arise. For example, the browser 103 requests a web page and a number of URLs are loaded into the HppCache 309. The browser 103 then retrieves these URLs from the HppCache 309. The same browser (or another browser) requests one of the URLs that have already been retrieved out of the HppCache 309 (the expiration timeout has lapsed, since the URL was initially inserted into the HppCache 309). When this occurs, the HppCache 309 forwards the request to the upstream proxy 215 with an HppBypass field under the assumption that there was a reason why the URL was not retrieved from the browser's own cache. This bypass field is sufficient to retrieve the URL—provided it is not in the process of being promised by the parsing of a different HTTP request.

In another situation, the browser 103 requests a web page and a number of URLs are pre-fetched and loaded into the HppCache 309. In turn, the browser 103 retrieves these pre-fetched URLs from the HppCache 309. Similar to the above situation, the same browser (or another browser) requests the same web page, triggering the HTML for the web page to be fetched. The upstream proxy 215 provides a promise to pre-fetch the same set of URLs; these promises overwrite the existing HppCache entries for those URLs when they arrive. The browser 103 may request some of these URLs before the promise arrives, and other of these URLs after their promise arrives. In such a scenario, a couple of courses of action exist, depending on whether the expiration timeout has lapsed since the URL was placed in the HppCache 309. If less than the timeout, the URL is retrieved from the cache 309 and delivered to the browser 103; otherwise, the browser 103, when requesting a URL before the promise arrives sends a HppBypass type request. In such a case, the browser 103 sends a pre-fetch serial number, which identifies the particular pre-fetch of the URL should be bypassed, along with the request. The upstream proxy 215, upon receiving an HppBypass request, determines from the HppHistory object whether a more recent promise of the URL has been made. The upstream proxy 215 returns an HppPromised response (without fetching the URL) when a more recent promise is outstanding. The downstream proxy 213 then "awaits" the promise and returns the promised URL accordingly.

When the browser 103 requests a URL after a repeat promise of the URL has been made, the downstream proxy 213 waits for the promised URL as if it were requesting a promised URL that had not been recently retrieved and put in the HppCache 309.

Under certain situations, the possibility of duplicate promises exists. For example, the downstream proxy 213 may support two different users, such that their browsers retrieve the same page or different pages which reference common pre-fetchable URLs at nearly the same time. In such a case, the upstream proxy 215 has two pre-fetch operations occurring in parallel, promising and pre-fetching, in some cases, the same URL. However, this can be avoided, whereby the upstream proxy 215 utilizes the HppHistory object 317 to eliminate some duplicate transmission of data over the satellite link. The downstream proxy 213 could receive, in some cases, multiple nearly simultaneous promises and pre-fetches (arriving with different serial numbers). Consequently, the downstream proxy 213 rejects an additional promise for a URL that are already promised, but not pre-fetched. The downstream proxy 213 can also reject a pre-fetched URL whose promised was rejected, as well as a pre-fetched URL whose serial number does not match the serial number of the promise. The downstream proxy 213 can accept a promise for a URL that has already been pre-fetched, thereby causing the previously pre-fetched copy of the URL to be purged from the cache 309.

In the case of an aborted request, such as a user selecting a STOP button on the browser (or the browser malfunctions and exits), the downstream proxy 213 receives a connection reset and forwards a TTMP abort to the upstream proxy 215. Several outcomes are possible in such a scenario, depending on race conditions. If the abort arrives before any parsing commences, the HttpServ object's connection to the upstream proxy 215 is closed. For the case in which the abort request arrives after a promise list has been sent, the pre-fetching occurs and pre-fetched objects are forwarded downstream; the abort request is simply discarded. The abort request is also discarded, if the abort request arrives after the TTMP transaction has completed.

Figure 5:
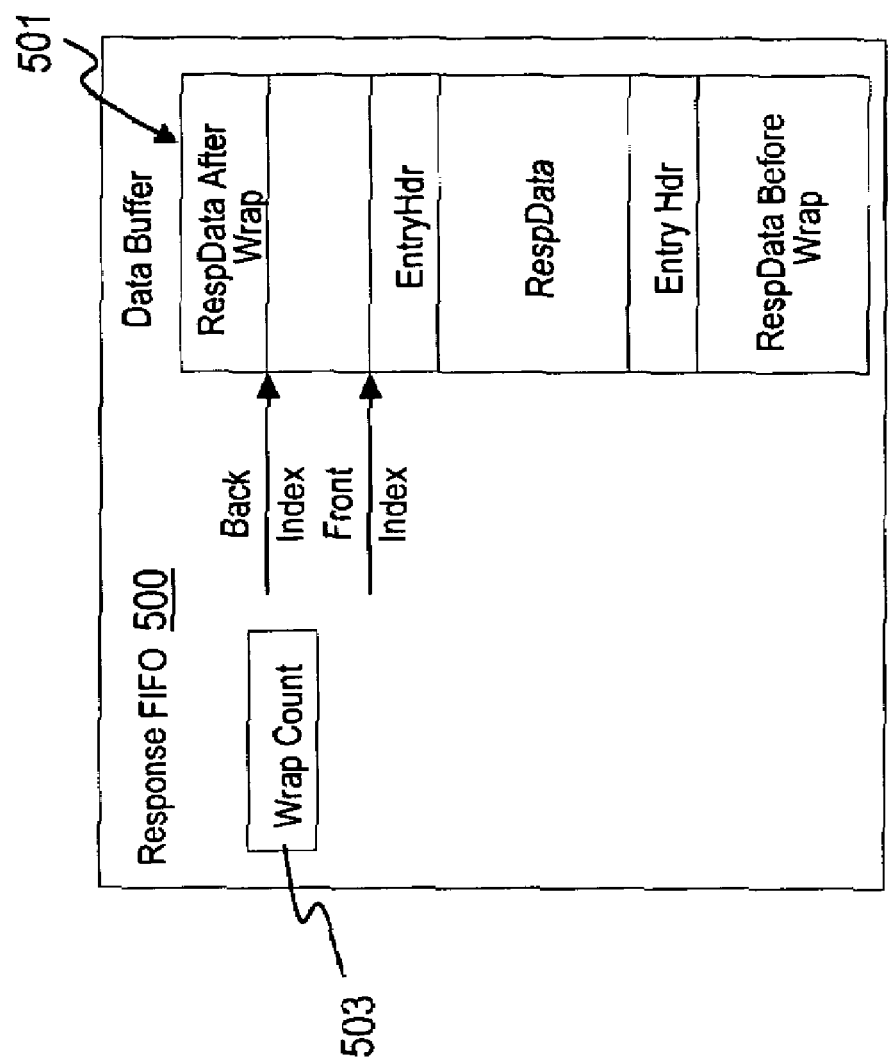
FIG. 5 is a diagram of a HyperText Transfer Protocol (HTTP) Parse and Pre-fetch (HPP) cache used in the system of FIG. 1.

FIG. 5 is a diagram of the internal structure of an HTTP Parse and Pre-fetch (HPP) cache used in the system of FIG. 1. Functionally, a Response FIFO 500 contains pre-fetched HttpResponse header and entity body data. As a FIFO, when full, the oldest entries are purged to make room for an object to be inserted. The Response FIFO 500 is indexed and a handle is returned to the caller when an entry is inserted into the FIFO 500. The handle allows a caller to determine whether the handle's entry is still present in the table and to access the handle's entry if so.

The structure of the Response FIFO 500, as shown, includes a Data Buffer 501 with a size that is configurable via a HppRespFIFOSizeInBytes parameter. An entry into the buffer 501 includes an EntryHdr (which cannot straddle wrapping around the end of the buffer 501 and which is aligned on an 8-byte boundary) and RespData (which can straddle wrapping around the end of the buffer 501). The EntryHdr includes the following fields: the number of RespData bytes, the wrap count when the item was inserted, a lock status, and a checksum of the header field. A Back Index is a circular buffer "back pointer" that indicates where the next entry is to begin. A Front Index is the "front pointer" indicating where the front entry begins. A Wrap Count 503 is a counter that tracks the number of times the front index has wrapped around the end of the buffer 501.

According to an embodiment of the present invention, when an entry is inserted into the Response FIFO 500, the handle that is returned is a 64-bit entity that includes the index into the data buffer 501 where the entry's header begins and the wrap count value which appears in the entry's header. When a client returns this handle in a request to access then data therein, the wrap count, back index and front index are used to determine whether the entry is present. If this check passes, the validity of the index is finalized by checking the length field and checksum of the EntryHdr referenced by the passed index.

An attempt to insert an item into the Response FIFO 500 is rejected if the insertion requires the deletion of one or more entries that are currently being accessed as indicated by their EntryHdr's lock bit. The downstream proxy 213 handles this attempt essentially the way that an HppHeaderOnly response with no Last-Modified field is handled, that is, by sending an HppBypass field.

Figure 6:
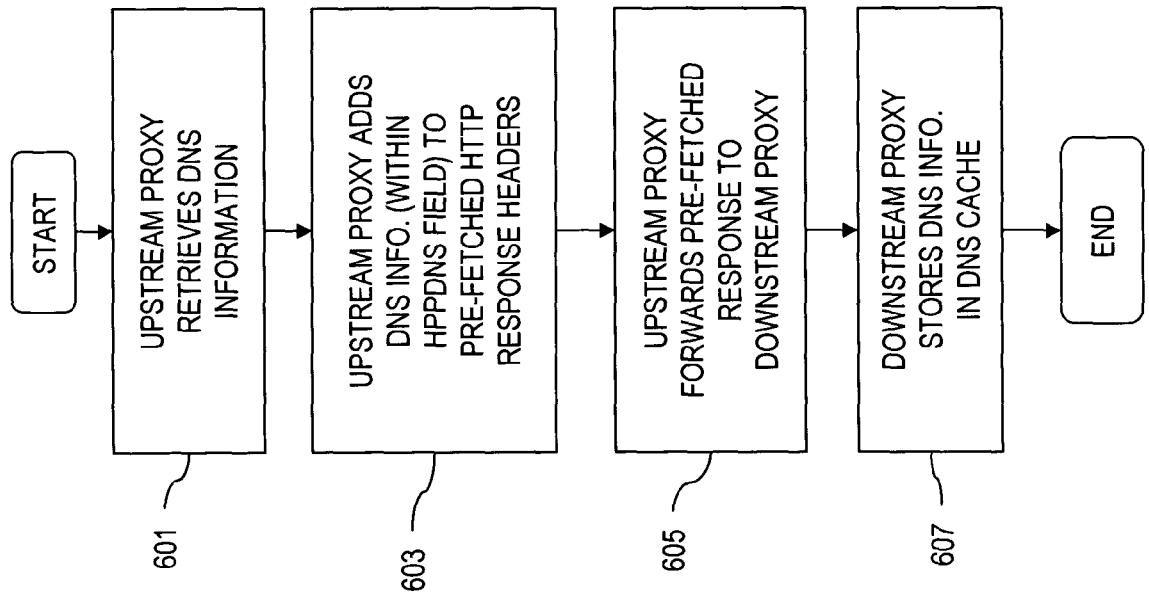
FIG. 6 is a flowchart of a process for piggybacking Domain Name Service (DNS) information with pre-fetched objects, according to an embodiment of the present invention.

FIG. 6 shows a flowchart of a process for piggybacking Domain Name Service (DNS) information with pre-fetched objects, according to an embodiment of the present invention. The parse and pre-fetch operation also provides for efficient handling of DNS information by piggybacking the DNS information with the pre-fetched response. That is, a domain name service (DNS) cache can be deployed within the downstream ST 205 (FIG. 2). In this example, the upstream proxy retrieves the DNS information, per step 601. Next, the upstream proxy 215 can utilize a HPPDNS field within the pre-fetched HTTP response headers (step 603); such a field can specify the server's domain name and IP address (e.g., as 8 hex digits). The upstream proxy 215 then forwards the pre-fetched response (with the HPPDNS field) to the downstream proxy 213, as in step 605.

By way of example, the downstream proxy 213, when appropriately configured with the IP address and port number and password of the DNS cache, takes the HPPDNS field and places it in a UDP packet (along with a digital signature based on the password) and send the UDP packet to the DNS cache (per step 607). The downstream proxy 213 strips the HPPDNS field from the HTTP response header prior to forwarding the header to the browser 103. The corresponding DNS cache, upon receiving a valid pre-load packet from an authorized source IP address, should put the translation of domain name to IP in its cache and return DNS responses immediately to any outstanding domain name lookup requests it is handling.

Figure 7B:
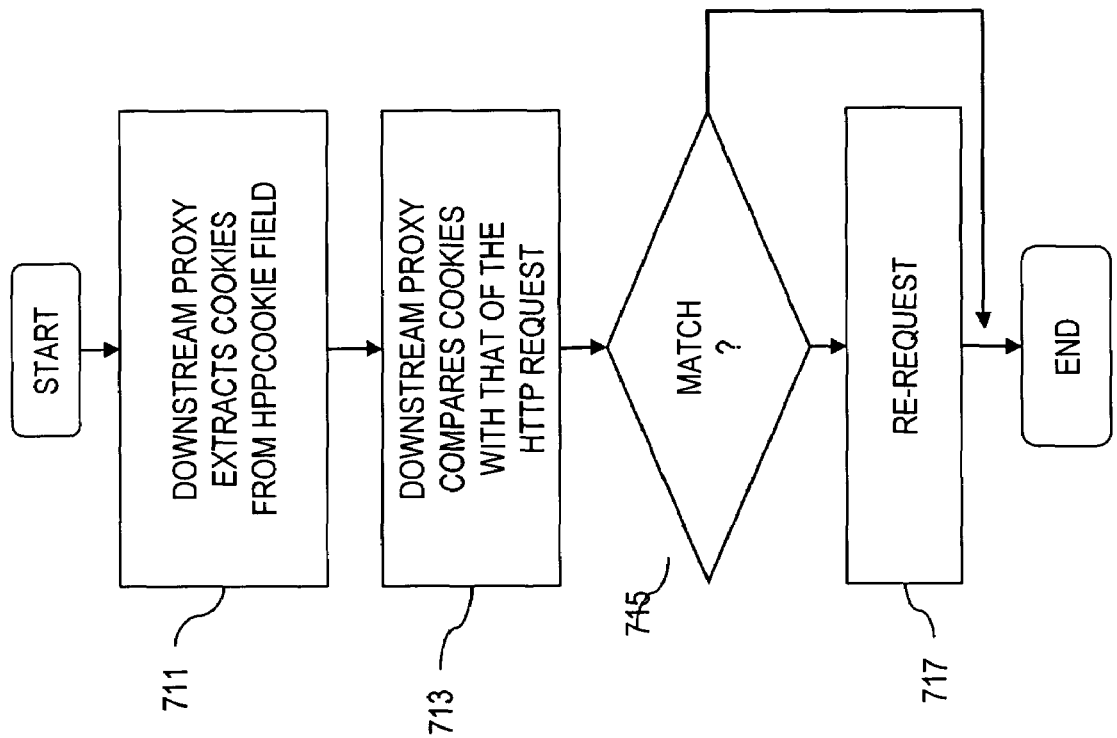

FIGS. 7A and 7B are flowcharts of a process for handling cookies in a parse and pre-fetch operation, according to an embodiment of the present invention. The handling of "Cookies" poses some challenges to the parse and pre-fetch operation. Cookies together with HPP present the possibility of producing either double transmission of a web page's data or broken pages. A "Cookie" is a piece of data originally supplied by a web server 109 which is returned in the HTTP request to the same web (or related) server by the browser 103 in subsequent HTTP requests. Cookies are used, in some cases, to maintain state information that affects the data produced by a web server 109.

According to an embodiment of the present invention, the upstream proxy 215 attempts to supply the same cookies the browser 103 would supply while also supplying information that enables a downstream proxy 213 to determine whether the correct set of cookies were actually used. This approach favors simplicity over a small of possibility of introducing unnecessary repeat transmission of URL data, while minimizing the probability of broken pages.

As seen in FIG. 7A, the upstream proxy 215, when handling a request from the downstream proxy 213, keeps a copy of the request's COOKIE fields, per step 701. Also, the upstream proxy 215, when handling responses from web servers (e.g., server 109), keeps a copy of any cookies provided in SET-COOKIE fields provided by the web server 109. These cookies are stored along with the associated domain information. For example, such cookies are kept by the HppParse object 321 and a HppCookieJar object 325; that is, in storage the cookies are associated with a single URL and any pre-fetch retrievals directly or indirectly associated with that URL. Per steps 703-707, when initiating a pre-fetch retrieval, the upstream proxy 215 looks up the domain name of the URL being retrieved and, if one or more COOKIEs that tail match the URL's that domain name, the upstream proxy 215 includes those cookies in a COOKIE field in the pre-fetch HTTP request for transmission to the downstream proxy 213. However, if the cookies do not match, the upstream proxy 215 does not send the pre-fetched object (URL) (step 709).

When searching the HppCookieJar object 325 for valid cookies, a comparison of the domain attributes of the cookie is made with the Internet domain name of the host (e.g., web server 109) from which the URL will be fetched. If there is a tail match, then the cookie undergoes path matching to determine whether it should be sent. "Tail matching" involves a comparison whereby the domain attribute is matched against the tail of the fully qualified domain name of the host. For example, a domain attribute of "acme.com" would match host names "anvil.acme.com" as well as "shipping.crate.acme.com".

It is noted that only hosts within the specified domain can set a cookie for a domain, and that domains needs to have at least two or three periods (".") in them to prevent domains of the form: ".com", ".edu", and "va.us". Any domain that fails within one of the seven special top level domains listed below only require two periods; any other domain requires at least three. The seven special top level domains are: "COM", "EDU", "NET", "ORG", "GOV", "MIL", and "INT".

In step 711 (FIG. 7B), the downstream proxy 213 extracts a HppCookie field and determines, based on this information, what to do with the associated pre-fetched URL when it is requested by the browser 103. The HppCookie field is used when the upstream proxy 215 pre-fetches a URL and included one or more cookies in that URL. This field contains the complete contents of the COOKIE HTTP request header field sent to the origin server. The downstream proxy 213, as in step 713, compares this cookie field with the one contained in the HTTP request from the browser 103 to determine whether the URL needs to be re-requested because of a cookie mismatch (step 715). If a match exists, the URL is re-requested, per step 717.

In an exemplary embodiment, the downstream proxy 213 calculates a 32-bit hash for each of the cookies in the request from the browser 103 and for each of the cookies from the HppCookie field. The processing associated with these HASH fields is as follows. When these sets of HASH fields are identical, the downstream proxy 215 uses the pre-fetched URL response. If the pre-fetched URL was obtained with a set of cookies that are a superset of the browser's cookies, then the downstream proxy 215 uses the pre-fetched URL response provided the downstream proxy is configured for "Retry on cookie missing" or "No Cookie Retries". If the pre-fetched URL was obtained with a set of cookies and the request had no cookies, then the downstream proxy 215 uses the pre-fetched URL response provided the downstream proxy is configured for "Retry on cookie missing" or "No Cookie Retries" or "Retry on Cookie Mismatch". The URL is retried with an HPPBYPASS request when the downstream proxy 213 is configured for "Retry on restrictive cookie mismatch." In the event that the browser uses one or more cookies not used by the pre-fetch operation, the downstream proxy 213 discards the pre-fetched URL data and requests the URL from the upstream proxy 215 with an HPPBYPASS request—provided the downstream proxy 213 is not configured for "No Cookie Retries".

The above approach for handling cookies advantageously provides, in most cases, the cookies needed with requests to the same web server that initiated the web page. In a few cases, the same set of cookies cannot be provided along with a pre-fetch request. One such case is when the request is to another web server, and the browser 103 had cookies stored for that server 109. In another case, the web page starts off with a redirection and the browser 103 had cookies stored for the redirected server; when this occurs, the HTML for the page is "pre-fetched" without the browser being able to supply the COOKIE.

According to one embodiment of the present invention, the upstream proxy 215 maintains a Site Cookie hash table indexed by web site domain name. Each table entry contains information regarding the frequency of that domain name generating "NoCookie" and "WrongCookie HppBypass" requests. The upstream proxy 215 creates a table entry for a web site when it first receives a NoCookie or WrongCookie response. When the hash table has a "hash collision", the newer entry replaces the older entry.

Prior to adding a URL to a promise list, the upstream proxy 215 queries the Site Cookie hash table. The upstream proxy 215 aborts the pre-fetch operation and returns an HppHeaderOnly response under two conditions: when there are no cookies for the request and the table indicates that the frequency of "NoCookie" or "WrongCookie" responses exceeds configurable thresholds; and when there are cookies for the request and the table indicates that the frequency of "WrongCookie" responses exceed a configurable threshold. In this manner, the upstream proxy 215 avoids pre-fetching from sites that have a history of having pre-fetches fail because of cookie problems, thereby minimizing waste of bandwidth stemming from pre-fetched data that cannot be used.

Figure 8:
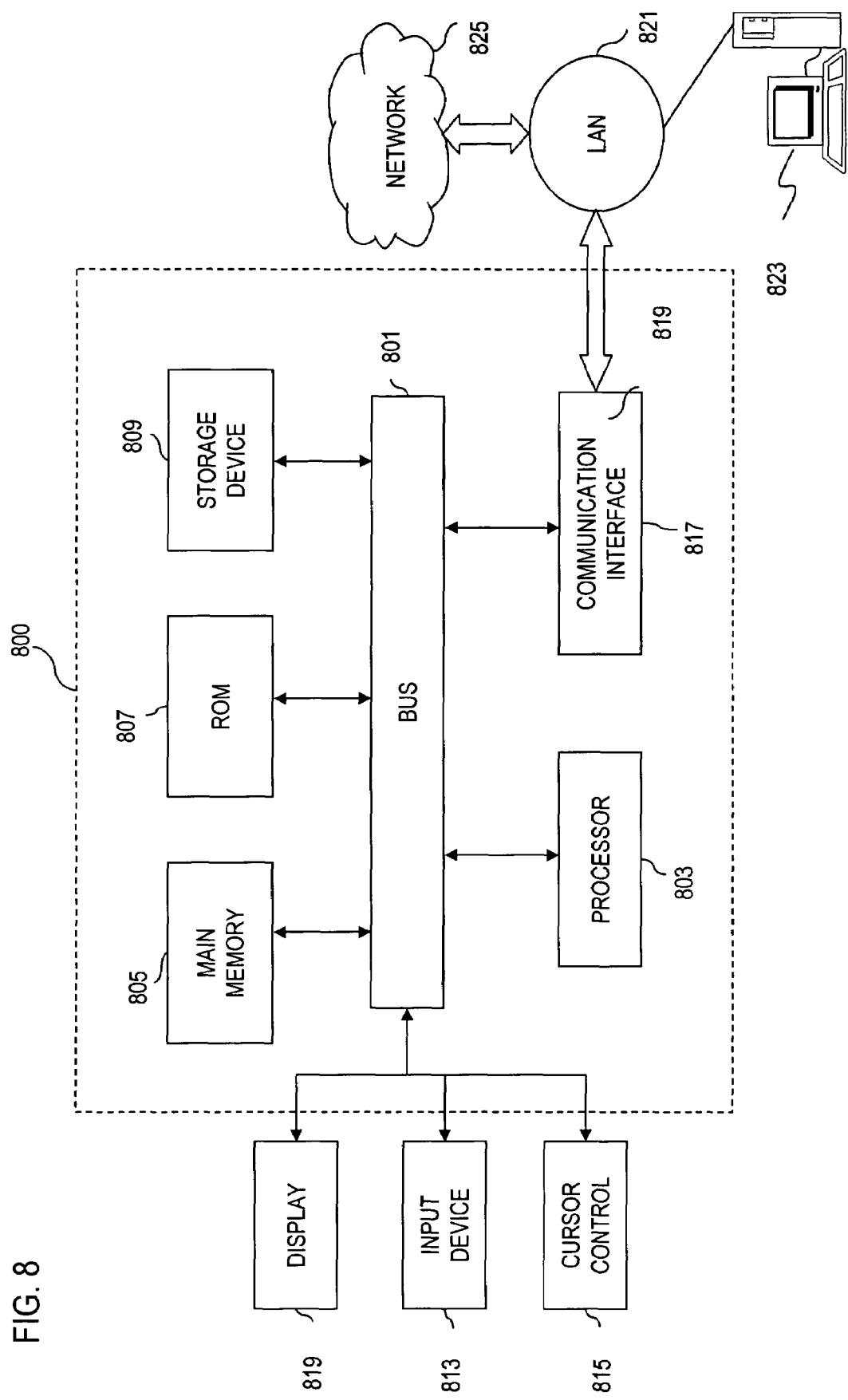
FIG. 8 is a diagram of a computer system that can support parsing and pre-fetching, according to an embodiment of the present invention.
Figure 9:
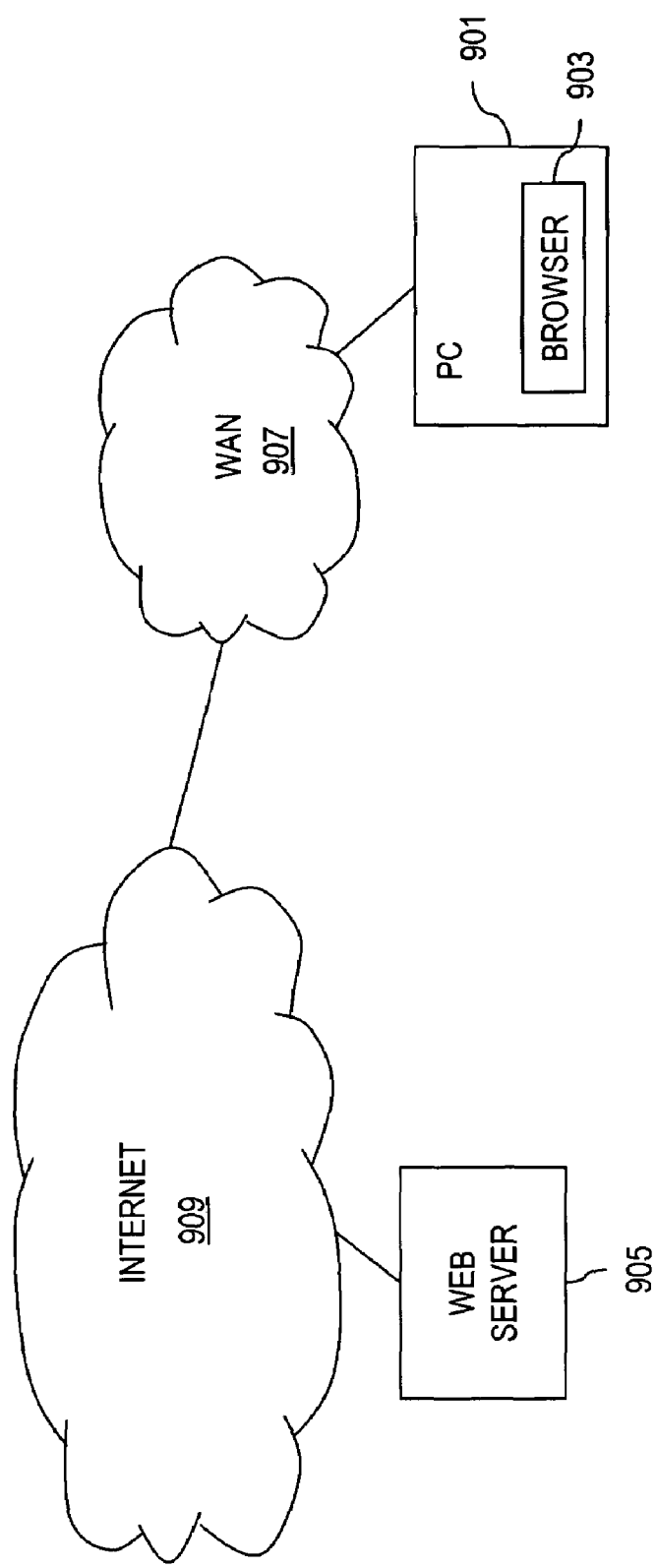
FIG. 9 is a diagram of a conventional communication system for providing retrieval of web content by a personal computer (PC).

FIG. 8 illustrates a computer system 800 upon which an embodiment according to the present invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment of the invention, the modules of the system of FIG. 4 is implemented by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the present invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including storage media but not limited to non-volatile media, volatile media or transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, an approach provides proxies to parse and pre-fetch web content over a data network. A downstream proxy receives a request from a browser to retrieve a web page from a web server. An upstream proxy parses the web page to determine objects embedded in the web page. The upstream proxy generates a promise list according to a criterion, including size and type of the embedded object. The promise list specifies the embedded objects that are to be pre-fetched from the web server. The promise list is transmitted to the downstream proxy, wherein the upstream proxy pre-fetches the embedded object from the web server. The upstream proxy determines whether to forward one of the pre-fetched embedded object to the downstream proxy based on a comparison of cookies associated with one of the pre-fetched objects supplied, respectively, by the browser and the web site. The upstream proxy also can obtain domain name service (DNS) information associated with the request, and the DNS information is piggybacked on one of the pre-fetched objects to the downstream proxy. Additionally, the downstream proxy selectively holds a subsequent request from the browser, if this request corresponds to an object specified on the list. Further, the downstream proxy and the upstream proxy utilize pre-fetched serial numbers to address duplicate transmissions of pre-fetched objects (and associated "promises") over the data network (e.g., satellite system). The above arrangement advantageously reduces response time, while conserving system bandwidth.

While the present invention has been described in connection with a number of embodiments and implementations, the present invention is not so limited but covers various obvious modifications and equivalent arrangements, which fall within the purview of the appended claims.

What is claimed is:

1. A method for providing a proxy service to retrieve content over a data network from a content server, the method comprising:
   forwarding a request for the content over the data network towards the content server, wherein a proxy in communication with the content server determines a plurality of objects corresponding to the content based on the request, the proxy generating a list specifying the objects that are to be pre-fetched according to a criterion, wherein number of objects specified in the list is limited by a configurable threshold;
   receiving the generated list in response to the request;
   receiving the pre-fetched objects on the list; and
   selectively holding a subsequent request associated with an object specified on the list.

2. A method according to claim 1, wherein the proxy in the forwarding step obtains domain name service (DNS) information associated with the request, the method further comprising:
   receiving from the proxy the DNS information piggybacked on one of the pre-fetched objects.

3. A method according to claim 1, wherein the proxy in the forwarding step receives a cookie associated with one of the pre-fetched objects and determines whether the received cookie matches that of a cookie provided in the request, the proxy not forwarding the pre-fetched object if there is no match.

4. A method according to claim 3, wherein the proxy in the forwarding step compares a domain name specified in the request with the cookie associated with the one pre-fetched object.

5. A method according to claim 1, wherein the proxy in the forwarding step assigns a plurality of identifiers corresponding to the objects in the list, the method further comprising:
   forwarding a message to the proxy specifying one of the identifiers to avoid duplicate retrieval of the one corresponding object.

6. A method according to claim 5, further comprising:
   rejecting a pre-fetched objected from the list based upon one of a rejection of the list and a discrepancy of the identifiers.

7. A method according to claim 1, wherein the criterion in the forwarding step includes one of object size and object type.

8. A method according to claim 1, wherein the content conforms with a markup language that includes Hypertext Markup Language (HTML).

9. A method according to claim 1, wherein the data network includes a Very Small Aperture Terminal (VSAT) satellite network, and the proxy in the forwarding step resides in a VSAT terminal in communication with the content server.

10. A method according to claim 1, further comprising:
    transmitting one of the received pre-fetched objects to a browser in response to a request from the browser.

11. A method according to claim 1, further comprising:
    outputting a log file to maintain statistical information on the proxy service.

12. A computer readable storage medium having instructions for providing a proxy service to retrieve content over a data network from a content server, said instruction, being arranged, upon execution, to cause one or more processors to perform the method of claim 1.

13. A network apparatus for providing a proxy service to retrieve content over a data network from a content server, the apparatus comprising:
    an interface configured to forward a request for the content over the data network towards the content server, wherein an upstream proxy in communication with the content server determines a plurality of objects corresponding to the content based on the request, the upstream proxy generating a list specifying the objects that are to be pre-fetched according to a criterion, wherein number of objects specified in the list is limited by a configurable threshold; and
    a downstream proxy configured to receive the generated list in response to the request and to receive the pre-fetched objects on the list, wherein the downstream proxy selectively holds a subsequent request associated with an object specified on the list.

14. An apparatus according to claim 13, wherein the upstream proxy obtains domain name service (DNS) information associated with the request and piggybacks the DNS information piggybacked onto one of the pre-fetched objects.

15. An apparatus according to claim 13, wherein the upstream proxy receives a cookie associated with one of the pre-fetched objects and determines whether the received cookie matches that of a cookie provided in the request, the upstream proxy not forwarding the pre-fetched object if there is no match.

16. An apparatus according to claim 15, wherein the upstream proxy compares a domain name specified in the request with the cookie associated with the one pre-fetched object.

17. An apparatus according to claim 13, wherein the upstream proxy assigns a plurality of identifiers corresponding to the objects in the list, and the downstream proxy forwards a message to the upstream proxy specifying one of the identifiers to avoid duplicate retrieval of the one corresponding object.

18. An apparatus according to claim 17, wherein the downstream proxy rejects a pre-fetched object from the list based upon one of a rejection of the list and a discrepancy of the identifiers.

19. An apparatus according to claim 13, wherein the criterion in the forwarding step includes one of object size and object type.

20. An apparatus according to claim 13, wherein the content conforms with a markup language that includes Hypertext Markup Language (HTML).

21. An apparatus according to claim 13, wherein the data network includes a Very Small Aperture Terminal (VSAT) satellite network, and the upstream proxy resides in a VSAT terminal in communication with the content server.

22. An apparatus according to claim 13, further comprising:
another interface configured to transmit one of the received pre-fetched objects to a browser in response to a request from the browser.

23. An apparatus according to claim 13, wherein the downstream proxy is configured to output a log file to maintain statistical information on the proxy service.

24. A method for providing a proxy service to retrieve content over a data network from a content server, the method comprising:
receiving a request for the content over the data network from a proxy;
generating a list specifying objects that are to be pre-fetched based on the request according to a criterion, wherein number of objects specified in the list is limited by a configurable threshold;
transmitting the generated list to the proxy in response to the request;
retrieving the objects in the list from the content server; and
forwarding the objects on the list to the proxy, wherein the proxy selectively holds a subsequent request associated with an object specified on the list.

25. A method according to claim 24, further comprising:
obtaining domain name service (DNS) information associated with the request; and
forwarding the DNS information piggybacked on one of the pre-fetched objects.

26. A method according to claim 24, further comprising:
receiving a cookie associated with one of the pre-fetched objects;
determining whether the received cookie matches that of a cookie provided in the request; and
blocking the forwarding of the one pre-fetched object if there is no match.

27. A method according to claim 26, wherein the proxy in the forwarding step compares a domain name specified in the request with the cookie associated with the one pre-fetched object.

28. A method according to claim 24, further comprising:
assigning a plurality of identifiers corresponding to the objects in the list; and
receiving a message from the proxy specifying one of the identifiers to avoid duplicate retrieval of the one corresponding object.

29. A method according to claim 28, wherein the proxy in the receiving step rejects a pre-fetched objected from the list based upon one of a rejection of the list and a discrepancy of the identifiers.

30. A method according to claim 24, wherein the criterion in the generating step includes one of object size and object type.

31. A method according to claim 24, wherein the content conforms with a markup language that includes Hypertext Markup Language (HTML).

32. A method according to claim 24, wherein the data network includes a Very Small Aperture Terminal (VSAT) satellite network.

33. A method according to claim 24, wherein the proxy in the receiving step transmits one of the pre-fetched objects to a browser in response to a request from the browser.

34. A method according to claim 24, further comprising:
outputting a log file to maintain statistical information on the proxy service.

35. A computer-readable storage medium having instructions for providing a proxy service to retrieve content over a data network from a content server, said instruction, being arranged, upon execution, to cause one or more processors to perform the method of claim 24.

36. A network apparatus for providing a proxy service to retrieve content over a data network from a content server, the apparatus comprising:
an interface configured to receive a request for the content over the data network from a downstream proxy; and
an upstream proxy configured to determine a plurality of objects corresponding to the content in response to the request, and to generate a list specifying the objects that are to be pre-fetched according to a criterion, wherein number of objects specified in the list is limited by a configurable threshold and the generated list is transmitted to the downstream proxy in response to the request, the upstream proxy retrieving the objects in the list from the content server, the objects on the list being forwarded to the downstream proxy,
wherein the downstream proxy selectively holds a subsequent request associated with an object specified on the list.

37. An apparatus according to claim 36, wherein the upstream proxy obtains domain name service (DNS) information associated with the request, and the DNS information is piggybacked on one of the pre-fetched objects to the downstream proxy.

38. An apparatus according to claim 36, wherein the upstream proxy receives a cookie associated with one of the pre-fetched objects, and determines whether the received cookie matches that of a cookie provided in the request, the forwarding of the one pre-fetched object blocked if there is no match.

39. An apparatus according to claim 38, wherein the downstream proxy compares a domain name specified in the request with the cookie associated with the one pre-fetched object.

40. An apparatus according to claim 36, wherein the upstream proxy assigns a plurality of identifiers corresponding to the objects in the list, the upstream proxy receiving a message from the downstream proxy specifying one of the identifiers to avoid duplicate retrieval of the one corresponding object.

41. An apparatus according to claim 40, wherein the downstream proxy rejects a pre-fetched object from the list based upon one of a rejection of the list and a discrepancy of the identifiers.

42. An apparatus according to claim 36, wherein the criterion includes one of object size and object type.

43. An apparatus according to claim 36, wherein the content conforms with a markup language that includes Hypertext Markup Language (HTML).

44. An apparatus according to claim 36, wherein the data network includes a Very Small Aperture Terminal (VSAT) satellite network.

45. An apparatus according to claim 36, wherein the downstream proxy transmits one of the pre-fetched objects to a browser in response to a request from the browser.

46. An apparatus according to claim 36, wherein the upstream proxy is configured to output a log file to maintain statistical information on the proxy service.

* * * * *